United States Patent
Shin et al.

(10) Patent No.: US 12,460,342 B2
(45) Date of Patent: Nov. 4, 2025

(54) CLOTHES TREATMENT APPARATUS

(71) Applicant: LG Electronics Inc., Seoul (KR)

(72) Inventors: Joongil Shin, Seoul (KR); Kyuchul Lee, Seoul (KR); Yulgi Jin, Seoul (KR); Hansol Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 18/575,119

(22) PCT Filed: Jun. 17, 2022

(86) PCT No.: PCT/KR2022/008610
§ 371 (c)(1),
(2) Date: Dec. 28, 2023

(87) PCT Pub. No.: WO2023/277413
PCT Pub. Date: Jan. 5, 2023

(65) Prior Publication Data
US 2024/0301612 A1    Sep. 12, 2024

(30) Foreign Application Priority Data
Jun. 28, 2021 (KR) .......... 10-2021-0083899

(51) Int. Cl.
*D06F 39/12* (2006.01)
*D06F 23/02* (2006.01)
(Continued)

(52) U.S. Cl.
CPC .............. *D06F 39/12* (2013.01); *D06F 23/02* (2013.01); *D06F 34/30* (2020.02); *D06F 34/32* (2020.02); *D06F 34/34* (2020.02)

(58) Field of Classification Search
CPC ....................................................... D06F 39/12
See application file for complete search history.

(56) References Cited

U.S. PATENT DOCUMENTS

2008/0229789 A1   9/2008  Kim et al.
2017/0137991 A1   5/2017  Pellegrin et al.

FOREIGN PATENT DOCUMENTS

EP      1871943 B1   8/2016
EP      3783144 A1   2/2021
(Continued)

OTHER PUBLICATIONS

International Search Report and Written Opinion in Appln. No. PCT/KR2022/008610, mailed on Sep. 28, 2022, 18 pages (with English translation).
(Continued)

*Primary Examiner* — Jason Y Ko
(74) *Attorney, Agent, or Firm* — Fish & Richardson P.C.

(57) ABSTRACT

The present application relates to a clothes treatment apparatus comprising: a cabinet having a cabinet body with one open side, a panel support part fixed to the cabinet body, a mounting panel fixed to the panel support part so as to close the one open side of the cabinet body, and a panel input hole penetrating the mounting panel; a drum which is rotatably provided in the cabinet so as to provide a space for accommodating clothes, and which has a drum input hole communicating with the panel input hole; and a shielding part including a shielding body for preventing the space between the mounting panel and the panel support part from being exposed to the outside, a panel fastening part for coupling the shielding body and the mounting panel, and an extended fastening part for connecting the shielding body and the panel support part.

20 Claims, 22 Drawing Sheets

(51) Int. Cl.
*D06F 34/30* (2020.01)
*D06F 34/32* (2020.01)
*D06F 34/34* (2020.01)

(56) References Cited

FOREIGN PATENT DOCUMENTS

| KR | 20-0395272 | 9/2005 |
| KR | 10-2008-0076119 | 8/2008 |
| KR | 10-1275202 | 6/2013 |
| KR | 10-2015-0094502 | 8/2015 |
| KR | 10-1962814 | 3/2019 |

OTHER PUBLICATIONS

Office Action in Korean Appln. No. 10-2021-0083899, mailed on Dec. 19, 2023, 10 pages (with English translation).
Extended European Search Report in European Appln. No. 22833469.4, mailed on Jun. 11, 2025, 10 pages.

(a)

(b)

(c)

CLOTHES TREATMENT APPARATUS

CROSS-REFERENCE TO RELATED APPLICATIONS

This application is a National Stage application under 35 U.S.C. 371 of International Application No. PCT/KR2022/008610, filed on Jun. 17, 2022, which claims the benefit of Korean Application No. 10-2021-0083899, filed on Jun. 28, 2021, the contents of which are incorporated by reference herein in their entirety.

TECHNICAL FIELD

The present application relates to a laundry treatment apparatus.

BACKGROUND

A laundry treatment apparatus may include any device capable of performing clothing treatment, such as washing, drying, or caring for the fabrics of clothing. Among laundry treatment apparatuses, a washing machine represents a device that removes contaminants from laundry by the action of detergent and water.

Washing machines may be categorized into agitation, vortex, and drum type washing machines according to the washing method. The agitation type machine washes clothing by rotating a washing rod protruding upward from the center of the tub from side to side. The vortex type washing machine washes laundry using friction between the water current and the laundry caused by rotating a disk-shaped pulsator provided in the lower part of the tub. The drum type washing machine washes laundry by placing water, detergent, and laundry in a drum having a number of lifters, which protrude from the inner surface of the drum, and rotating the drum.

Among conventional laundry treating apparatuses, there is a drum washing machine (Korean Patent Application Publication No. 10-2016-0029389). It includes a cabinet defining an outer appearance and a front panel defining a front surface. In addition, it has a structure that combines a detergent container for adding detergent, an operation part configured for a user to operate the laundry treatment apparatus, a power button for applying power to the laundry treatment apparatus, and an operation panel including a display part for displaying the status of the laundry treatment apparatus to the user.

Accordingly, moisture or foreign substances may infiltrate into a gap between the front panel and the operation panel or a gap between the cabinet and the operation panel, causing malfunction of the electronic components inside. In addition, due to the lack of integrity of the cabinet and the control panel, the aesthetics conveyed to the user may be reduced. Further, the operation panel is positioned on the outermost side, and thus external shocks can be transmitted directly to the electronic devices placed inside the operation panel.

Also, there is another conventional laundry treatment apparatus provided with an input/output device (interface) for a user to input control instructions to an electronic device (Korean Patent Application Publication No. 10-2014-0023986). Interfaces provided in the conventional laundry treatment apparatus include a display part configured to display control instructions selectable by the user, a search part configured for the user to search control instructions displayed on the display part, a selector allowing the user to select a control instruction displayed on the display part, and an input unit configured to request execution of the control instruction selected by the user. These interfaces are designed to be disposed in spaces separated from each other.

SUMMARY

An object of the present disclosure devised to solve the above-described problems is to provide a laundry treatment apparatus capable of preventing moisture or foreign substances from infiltrating into the inside through a connected portion between components defining an outer appearance.

Another object of the present disclosure is to provide a laundry treatment apparatus capable of preventing a connected portion between components defining an outer appearance from being exposed to the outside.

Another object of the present disclosure is to provide a laundry treatment apparatus capable of securing structural stability of the exterior by firmly coupling a connected portion between components defining the outer appearance.

Another object of the present disclosure is to provide a laundry treatment apparatus capable of preventing a connected portion between components defining the outer appearance from being exposed to catch and damage clothes or cause injury to a user.

Another object of the present disclosure is to provide a laundry treatment apparatus having an interface in which display of control instructions, search or change of displayed control instructions, and selection of the displayed control instructions are integrated into one device.

The objects of the present disclosure can be achieved by providing a laundry treating apparatus including a shielding part arranged to prevent a space between a mounting panel and a panel support from being exposed to the outside.

The present disclosure provides a laundry treatment apparatus including a cabinet including a cabinet body having an open surface, a panel support fixed to the cabinet body, a mounting panel fixed to the panel support to close the open surface of the cabinet body, and a panel inlet formed through the mounting panel in a penetrating manner, a drum rotatably arranged inside the cabinet to provide a space to accommodate laundry, the drum having a drum inlet communicating with the panel inlet, and a shielding part including a shielding body arranged to prevent a space between the mounting panel and the panel support from being exposed to an outside, a panel fastening portion coupling the shielding body and the mounting panel, and an extension fastening portion connecting the shielding body and the panel support.

The extension fastening portion may be disposed between the mounting panel and the panel support to connect the mounting panel and the panel support.

The mounting panel further may include a panel rib arranged to face the extension fastening portion and coupled to the extension fastening portion.

The panel support may further include a support coupling portion arranged to face the extension fastening portion and coupled to the extension fastening portion.

The mounting panel may include a panel coupling hole formed through the panel rib in a penetrating manner. The shielding part may include a shielding part coupling hole formed through the extension fastening portion in a penetrating manner to communicate with the panel coupling hole. The panel support may include a support coupling hole formed through the support coupling portion to communicate with the shielding part coupling hole.

The laundry treatment apparatus may further include a coupling member arranged to extend through the panel coupling hole, the shielding part coupling hole, and the support coupling hole.

The extension fastening portion may be disposed between the panel rib and the support coupling portion and coupled to the panel rib and the support coupling portion.

The panel support may include a support coupling protrusion extending from the support coupling portion in a direction away from the extension fastening portion and coupled to the cabinet body, wherein the cabinet body may include a support coupling hole configured to allow the support coupling protrusion to be inserted thereinto.

The shielding part may further include a reinforcing rib protruding from the shielding body toward the mounting panel to reinforce a rigidity of the shielding body.

The reinforcing rib may extend from the extension fastening portion in a direction away from the panel support portion.

The cabinet body may further include a cover panel defining a top surface, wherein the shielding part may be coupled to a top surface of the mounting panel.

The shielding body may be arranged to prevent a space between the panel support and the cover panel from being exposed to the outside.

One side of the shielding body may contact the mounting panel, and an opposite side of the shielding body may contact the cover panel.

The shielding body may include a shielding surface disposed over the mounting panel, and a connection surface provided to connect the shielding surface to the mounting panel.

The connection surface may include a surface inclined from the mounting panel toward the shielding surface or a curved surface having a preset curvature.

The mounting panel may include a top surface of the mounting panel arranged to face the shielding surface, a front surface of the mounting panel providing one surface having the panel inlet formed therein, and a corner of the mounting panel connecting the top surface of the mounting panel to the front surface of the mounting panel. The connection surface connects the shielding surface and the corner of the mounting panel.

The cabinet further may include a panel through-hole formed through the mounting panel in a penetrating manner. The laundry treatment apparatus may further include a first circuit board disposed inside the cabinet, an encoder including a fixed part fixed to the first circuit board, a rotary part rotatably coupled to the fixed part, and a signal generator configured to generate an electrical signal when the rotary part rotates, an actuator including a shaft inserted into the panel through-hole and coupled to the rotary part, a shaft through-hole formed through the shaft in a penetrating manner to receive the rotary part inserted thereinto, a handle fixed to the shaft so as to be positioned on an outside of the cabinet and configured to receive an input of force necessary for rotation of the shaft, an accommodation space provided inside the handle and communicating with the shaft through-hole, and a handle through-hole formed through one surface of the handle to allow the accommodation space to communicate with an outside therethrough, and a display part including a fastening body inserted into the shaft through-hole and fixed to the fixed part, an accommodation body fixed to the fastening body and disposed inside the accommodation space, and a display fixed to the accommodation body to face the handle through-hole and configured to display information.

The display may be configured to display preset information according to the electrical signal generated by the signal generator.

The present disclosure has an effect of providing a laundry treatment apparatus capable of preventing moisture or foreign substances from infiltrating into the inside through a connection portion between components defining an outer appearance.

In addition, the present disclosure may provide a laundry treatment apparatus capable of preventing a connection portion between components defining an outer appearance from being exposed to the outside.

In addition, the present disclosure may provide a laundry treatment apparatus capable of securing structural stability of an exterior by firmly coupling a connection portion between components defining the outer appearance.

In addition, the present disclosure may provide a laundry treatment apparatus capable of preventing a connection portion between components defining the outer appearance from being exposed to catch and damage clothes or cause injury to a user.

Further, the present disclosure may provide a laundry treatment apparatus having an interface in which display of control instructions, search or change of displayed control instructions, and selection of the displayed control instructions are integrated into one device.

DETAILED DESCRIPTION

Hereinafter, a preferred embodiment of a laundry treatment apparatus will be described in detail with reference to the accompanying drawings.

Figure 1:
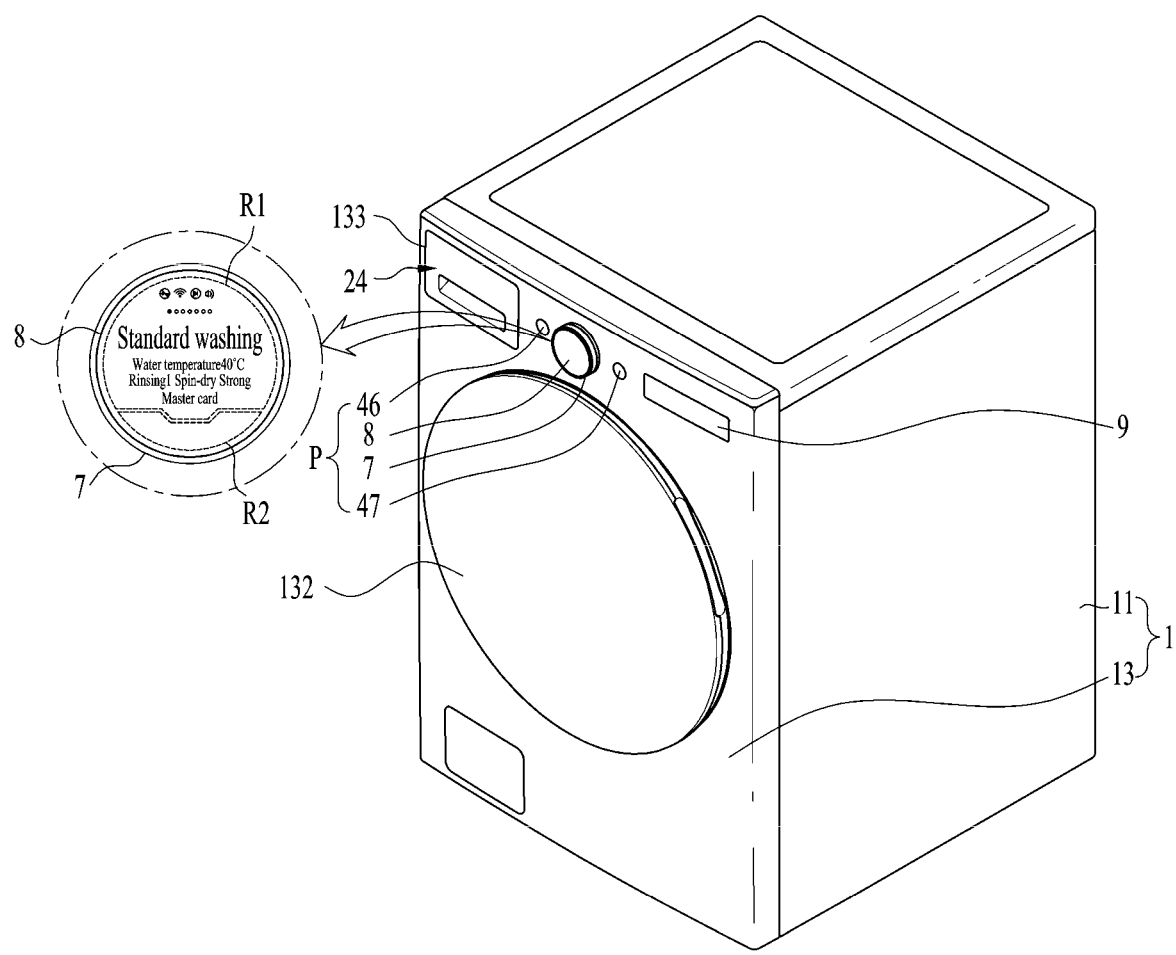
FIGS. 1 and 2 illustrate an interface and an example of a laundry treatment apparatus having the interface.

As shown in FIG. 1, a laundry treatment apparatus 100 may include a cabinet 1, and an interface P provided in the cabinet 1. The interface P described in the present disclosure refers to a device or program that enables communication between a user and the laundry treatment apparatus (including other electronic devices). The communication between the user and the laundry treatment apparatus refers to the operation of the user inputting control instructions to the laundry treatment apparatus and the operation of the laundry treatment apparatus delivering information to the user.

The cabinet 1 may include a cabinet body 11 having one open side, and a panel (or mounting panel) 13 fixed to the open side of the cabinet body. FIG. 1 illustrates a case where the mounting panel 13 is fixed to the front side of the cabinet body 11 to define the front face of the laundry treatment apparatus.

Figure 2:
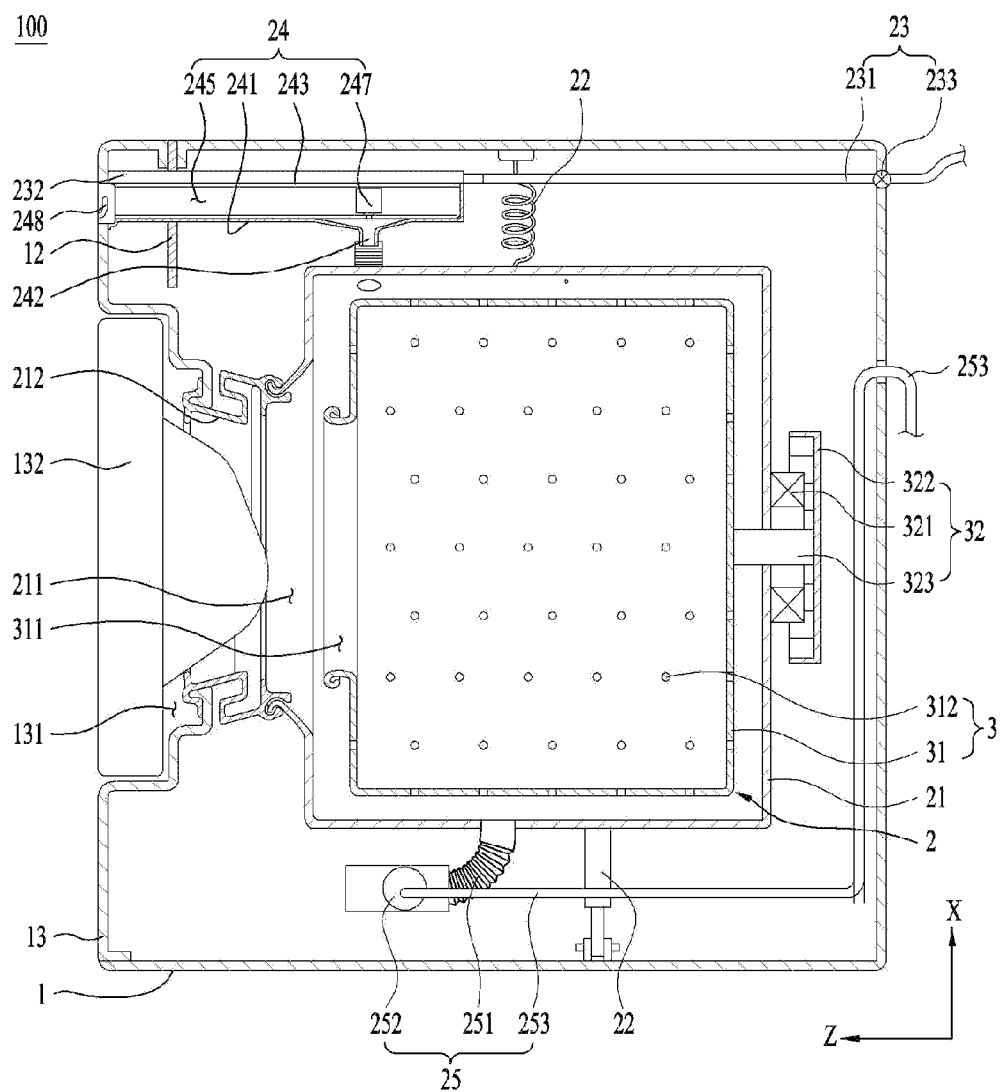

As shown in FIG. 2, the mounting panel 13 is provided with a panel inlet 131 allowing the interior and exterior of the cabinet 1 to communicate with each other. The panel inlet 131 is arranged to be closed by a door 132 rotatably fixed to the cabinet 1.

A tub 2 providing a space to store water may be provided in the cabinet 1. Also, a drum 3 may be rotatably disposed inside the tub to provide a space to accommodate clothing (collectively referred to as laundry objects).

The tub 2 may include a tub body 21 having the shape of a hollow cylinder. The tub body 21 may be fixed inside the cabinet 1 by a tub support 22. FIG. 2 illustrates a case where the tub support 22 includes a spring (connecting the upper space of the tub body to the cabinet) and a damper (connecting the lower space of the tub body to the cabinet).

A tub inlet 211 is provided on a side of the space in the tub body 21 that faces the panel inlet 131. The panel inlet 131 and the tub inlet 211 may be connected through a gasket 212. The gasket 212 is provided as an elastic member such as rubber. It is a means to prevent water inside the tub body 21 from being discharged into the cabinet 1 and to minimize transmission of vibration of the tub body 21 to the cabinet 1.

The tub body 21 is supplied with water via a water supply part 23, and water stored in the tub body 21 may be discharged from the cabinet 1 through a drainage part 25.

The drainage part 25 may include a pump 252 disposed at a position lower than that of the tub body 21, a first drainage pipe 251 connecting the tub body 21 to the pump 252, and a second drainage pipe 253 directing water discharged from the pump 252 to the outside of the cabinet.

The water supply part 23 may include a water supply pipe 231 connecting the tub body 21 to a water source located outside of the cabinet, and a water supply valve 233 configured to control opening and closing of the water supply pipe 231.

As shown in the figure, the laundry treatment apparatus 100 may further include a detergent supply part 24.

Figure 3:
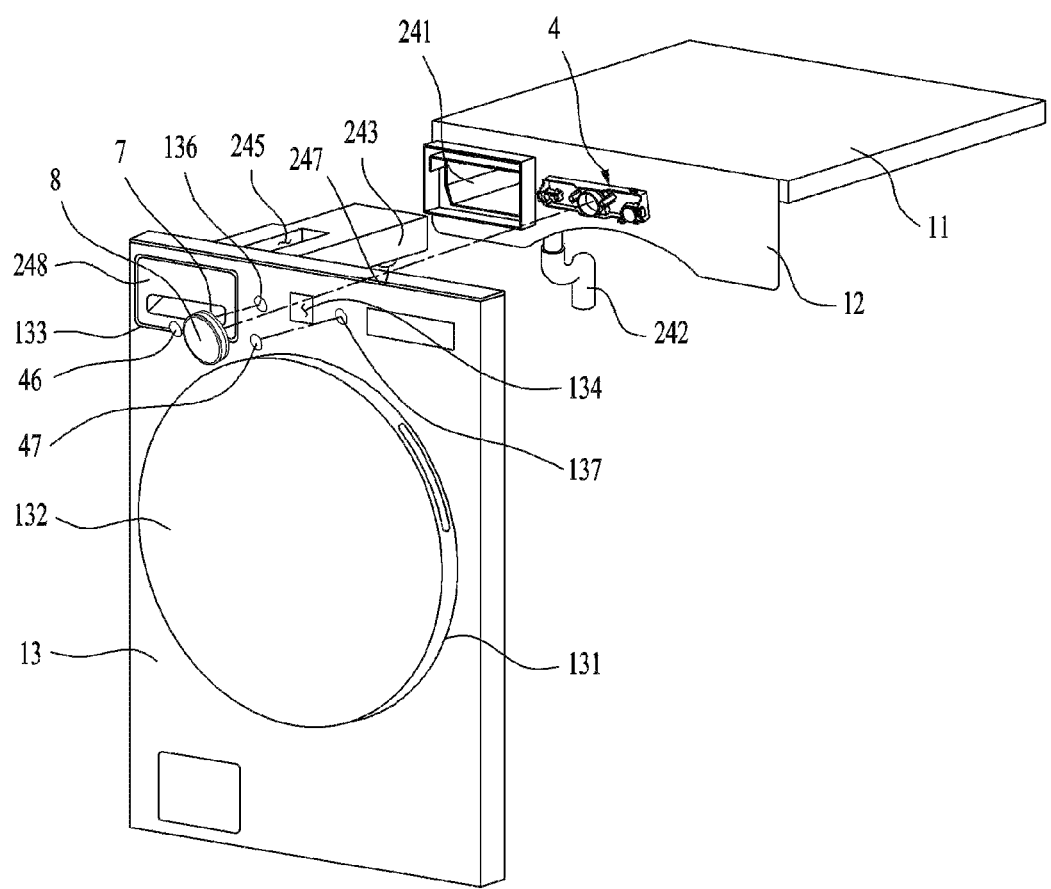
FIGS. 3 and 4 illustrate an example of a coupling structure of a cabinet and an interface.

As shown in FIG. 3, the detergent supply part 24 may include a drawer housing 241 arranged inside the cabinet 1, a connection pipe 242 connecting the drawer housing to the tub body 21, and a drawer 243 withdrawable from the drawer housing 241 through a drawer inlet 133 provided in the mounting panel 13.

The drawer 243 may include a chamber 245 providing a space to store detergent, and a discharge channel 247 along which the detergent in the chamber is discharged to the drawer housing 241. The discharge channel 247 may be provided with a water trap (siphon channel, etc.) to move liquid into the drawer housing 241 when the level of liquid stored in the chamber 245 exceeds a preset level.

When the detergent supply part 24 is arranged in the laundry treatment apparatus 100, the water supply part 23 may further include a nozzle 232 through which water is supplied to the chamber 245. The nozzle 232 may be fixed to the cabinet 1 so as to define a top surface of the drawer housing 241, and the water supply pipe 231 may be arranged to connect the nozzle 232 to a water supply source.

The front surface of the drawer 243 may be provided with a drawer panel 248. The drawer panel 248 may be shaped to close the drawer inlet 133. Also, the drawer panel 248 may be provided with a drawer handle.

As shown in FIG. 2, the drum 3 may include a drum body 31 of a cylindrical shape disposed inside the tub body 21, and a drive part 32 configured to rotatably fix the drum body 31 to the tub body 21.

A drum inlet 311 is provided on a side of the space in the drum body 31 that faces the tub inlet 211. Thus, clothing may be introduced into the drum body 31 through the panel inlet 131, the tub inlet 211, and the drum inlet 311.

The drum body 31 is provided with drum through-holes 312 allowing the inside of the drum body to communicate with the outside therethrough. The drum through-holes 312 may be provided in a circumferential surface, a front surface (the surface surrounding the drum inlet), and a rear surface of the drum body 31, respectively. Thus, water or detergent supplied into the tub body 21 may be supplied into the drum body 31 through the drum through-holes 312.

The drive part 32 may include a stator 321 fixed to a rear surface of the tub body 21 and forming a rotating magnetic field, a rotor 322 rotated by the rotating magnetic field, and a rotation shaft 323 extending through the rear surface of the tub body 21 to connect the drum body 31 and the rotor 322.

Figure 4:
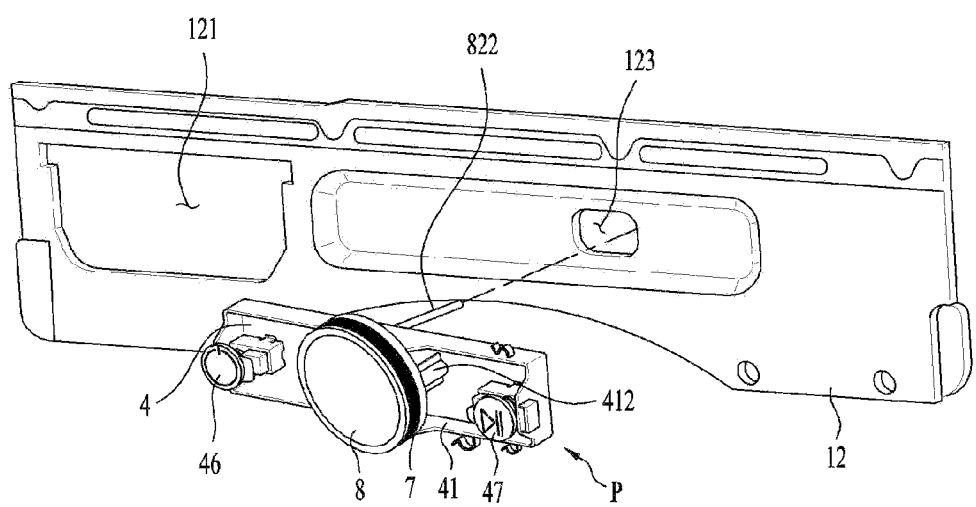

As shown in FIG. 3, the mounting panel 13 may be fixed to the cabinet body 11 by a panel support 12. That is, the panel support 12 may be fixed to the cabinet body 11, and the mounting panel 13 may be fixed to the panel support 12. In this case, as shown in FIG. 4, the panel support 12 may be provided with a drawer through-hole 121 through which the drawer 243 passes.

The interface P may be fixed in an interface mounting groove provided in the panel support 12, or may be fixed to the mounting panel 13 so as to be positioned in the interface mounting groove.

Figure 5:
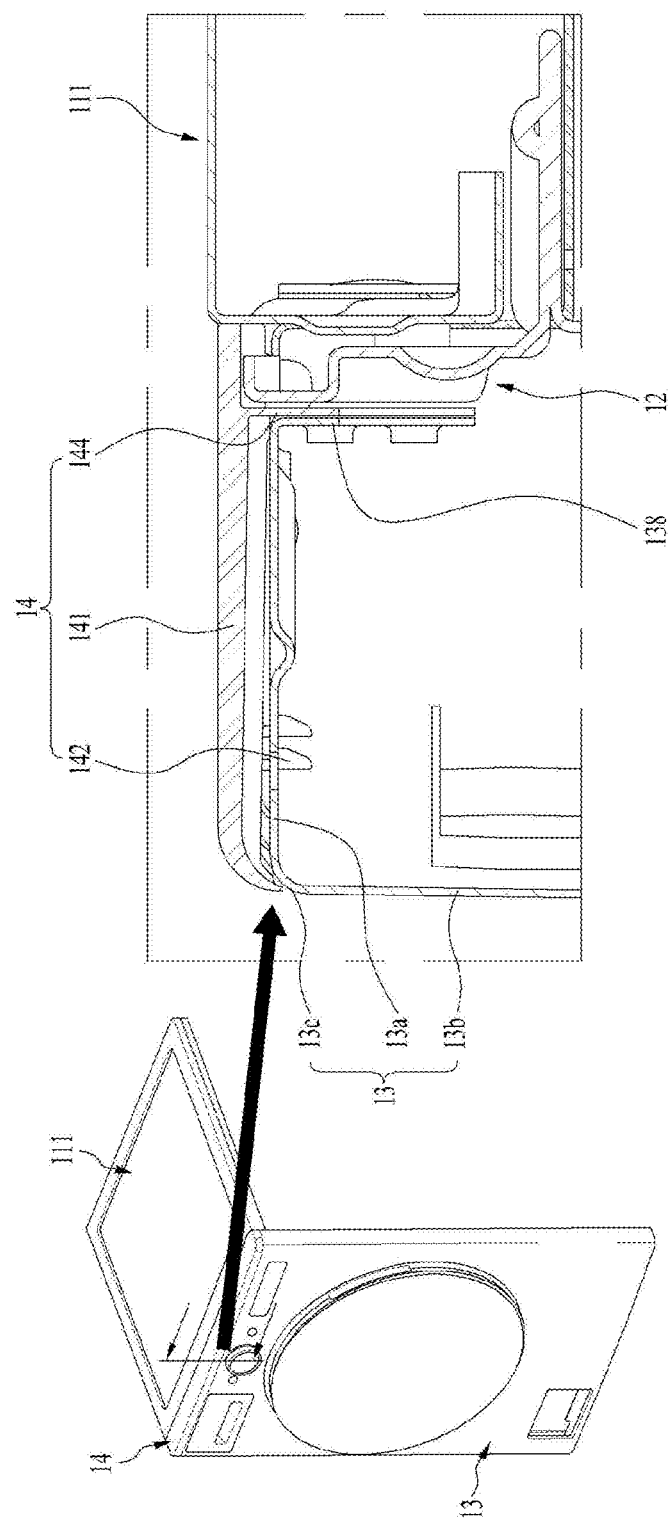
FIG. 5 shows an example of a coupling structure of a mounting panel and a cabinet body.

Referring to FIG. 5, a structure in which the mounting panel 13 is coupled to the cabinet body 11 is shown. In particular, a cross-section of portion of the cabinet body 11 and the mounting panel 13 coupled to each other are shown.

The mounting panel 13 according to an embodiment of the present disclosure may be fixed to the cabinet body 11 by the panel support 12 fixed to the cabinet body 11. That is, the cabinet body 11 and the panel support 12 may be connected to each other, and the panel support 12 and the mounting panel may be connected to each other. In other words, the mounting panel 13 may be directly connected to the cabinet body 11, or may be indirectly connected to the cabinet body 11 by the panel support 12.

Alternatively, a portion of the mounting panel 13 may be directly connected to the cabinet body 11, and another portion of the mounting panel 13 may be indirectly connected to the cabinet body 11 by the panel support 12.

The panel support 12 may be coupled to one open surface of the cabinet body 11. That is, the panel support 12 may be arranged on a side of the cabinet body 11 to which the mounting panel 13 is coupled to couple the mounting panel 13 to the cabinet body 11. In other words, the panel support 12 may be coupled to the side of the cabinet body 11 on which the panel inlet 131 is provided.

The panel support 12 may be disposed between the mounting panel 13 and the cabinet body 11 to connect the mounting panel 13 to the cabinet body 11.

According to an embodiment of the present disclosure, the laundry treatment apparatus 100 may further include a shielding part 14 provided to prevent a space between the mounting panel 13 and the panel supporting portion 12 from being exposed to the outside.

In addition, the mounting panel 13 may be formed of a metal material. The cabinet body 11 may also be formed of a metal material. The mounting panel 13 and the cabinet body 11 may define the outer appearance. When the mounting panel 13 and the cabinet body 11 are formed of a metal material such as stainless steel, the aesthetics of the product may be improve.

On the other hand, when the outer appearance is formed of a metal material, the completeness of the finish between the mounting panel 13 and the cabinet body 11 may be lowered. Accordingly, when the space between the mounting panel 13 and the cabinet body 11 is exposed to the user, aesthetics may be lowered. The shielding part 14 may be provided to prevent the space between the mounting panel 13 and the cabinet body 11 from being exposed, thereby improving aesthetics.

Unlike the mounting panel 13, the shielding part 14 may be made of a synthetic resin material. The shielding part 14 may be injection-molded, and thus be manufactured in various shapes. The shielding part 14 may be formed of a material such as plastic to be manufactured in various shapes, which may facilitate molding of a coupling portion coupled to other components.

In other words, the shielding part 14 may prevent the space between the mounting panel 13 and the cabinet body 11 from being exposed to the outside, and may improve assemblability of the mounting panel 13 and the cabinet body 11.

The shielding part 14 may include a shielding body 141 configured to prevent the space between the mounting panel 13 and the panel support 12 from being exposed to the outside. The shielding body 141 may be have a plate shape capable of covering the space between the mounting panel 13 and the panel support 12. The shielding body 141 may be arranged to cover the space between the panel support 12 and the cabinet body 11 while covering the space between the mounting panel 13 and the panel support 12.

The cabinet body 11 may include a cover panel 111 defining one surface of the cabinet body. FIG. 5 illustrates an example in which the cover panel 111 is positioned at the top of the laundry treatment apparatus. That is, the cover panel 111 may be arranged to define a top surface of the cabinet body 11. When the cover panel 111 is positioned as shown in FIG. 5, the cover panel 111 may be referred to as an upper panel.

The shielding body 141 may cover the space between the mounting panel 13 and the panel support 12, and may cover the space between the panel support 12 and the cover panel 111 at the same time.

The shielding part 14 may include a panel fastening portion 142 configured to couple the shielding body 141 and the mounting panel 13. The panel fastening portion 142 may protrude from the shielding body 141 toward the mounting panel 13. The panel fastening portion 142 may be coupled to one surface of the mounting panel 13. In the figure, an example in which the panel fastening portion 142 is coupled to the top surface 13a of the mounting panel is illustrated. A structure in which the panel fastening portion 142 is coupled to the mounting panel 13 will be described later.

The shielding part 14 may further include an extension fastening portion 144 connecting the shielding body 141 and the panel support 12. The extension fastening portion 144 may extend from the shielding body 141 toward the mounting panel 13 or the panel support 12. The extension fastening portion 144 may be a medium connecting the mounting panel 13 and the panel support 12. That is, the mounting panel 13 and the panel support 12 may be connected by the extension fastening portion 144.

Referring to FIG. 5, the extension fastening portion 144 may be positioned between the mounting panel 13 and the panel support 12 to connect the mounting panel 13 and the panel support 12. One surface of the extension fastening portion 144 may be in contact with the mounting panel 13 and the opposite surface thereof may be in contact with the panel support 12.

Specifically, the mounting panel 13 may further include a panel rib 138 extending from the top surface 13a of the mounting panel in a direction away from the shielding body and coupled to the extension fastening portion 144. The panel rib 138 may be coupled to the extension fastening portion 144.

Figure 6:
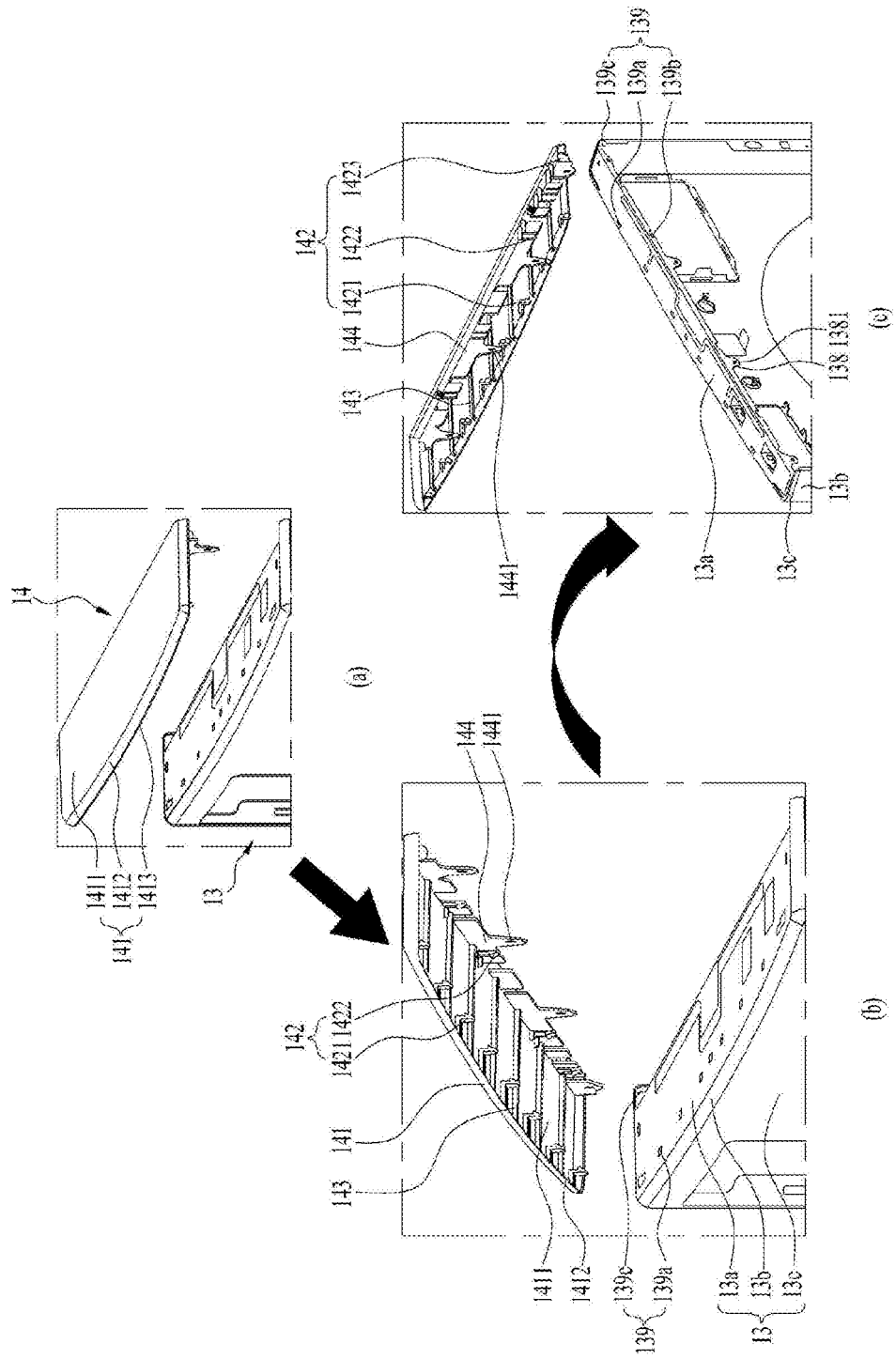
FIG. 6 shows an example of a coupling structure of a mounting panel and a shielding part.

The shielding part 14 may be coupled to the mounting panel 13 in a structure shown in FIG. 6. FIG. 6 illustrates an example in which the shielding part 14 is coupled to an upper portion of the mounting panel 13.

The mounting panel 13 may be formed in a bent shape using one steel plate. That is, the mounting panel 13 may be manufactured by bending one steel plate.

The mounting panel 13 may include a front surface 13b of the mounting panel exposed to the outside and defining an outer appearance, a top surface 13a of the mounting panel that is prevented from being exposed to the outside by the shielding part 14, and a corner 13c of the mounting panel connecting the front surface 13b of the mounting panel and the top surface 13a of the mounting panel. The corner 13c of the mounting panel may refer to a portion that is folded in a process of bending the steel plate.

The mounting panel 13 may include a panel fixing portion 139 to which the panel fastening portion 142 is coupled or fixed. In particular, the panel fixing portion 139 may be provided on the top surface 13a of the mounting panel so as to be coupled to the panel fastening portion 142.

The panel fastening portion 142 may be formed in the shape of a hook, and the panel fixing portion 139 may be formed in the shape of a groove in which the hook may be fixed. That is, the panel fastening portion 142 may be formed in the shape of a hook extending from the shielding body 141 toward the mounting panel 13, and the panel fixing portion 139 may be provided as a groove formed through the top surface 13a of the mounting panel in a penetrating manner or recessed from the top surface 13a of the mounting panel.

However, coupling the panel fastening portion 142 to the panel fixing portion 139 in a hooking manner is merely an example, and various coupling methods may be used for the panel fastening portion 142 to fix the shielding body 141 to the mounting panel 13. In addition, the position at which the panel fixing portion 139 is provided may not be limited to the top surface 13a of the mounting panel, but may be provided on various surfaces of the mounting panel 13 as long as the panel fixing portion 139 can be coupled to the panel fastening portion 142.

The panel fastening portion 142 may include a front fastening portion 1421 provided at a front side of the shielding body 141, a rear fastening portion 1422 spaced apart from the front fastening portion 1421 to be positioned on a side close to the cabinet body 11 and arranged at a rear side of the shielding body 141, and a side fastening portion 1423 disposed to be spaced apart from the front fastening portion 1421 and the rear fastening portion 1422.

The front fastening portion 1421, the rear fastening portion 1422, and the side fastening portion 1423 may be formed in a hook shape. However, the present disclosure is not limited thereto. They may be formed in various shapes to be coupled to the mounting panel 13.

As the panel fastening portion 142 includes the front fastening portion 1421, the rear fastening portion 1422, and the side fastening portion 1423, it may firmly couple the shielding body 141 to the mounting panel 13. In the case where the panel fastening portion 142 is provided on only one side surface of the shielding body 141, the coupling on the side of the shielding body 141 far from the panel fastening portion 142 may be degraded. However, when the panel fastening portion 142 includes the front fastening portion 1421, the rear fastening portion 1422, and the side fastening portion 1423, the shielding body 141 may be fixed on multiple sides, thereby securing a coupling force.

A plurality of front fastening portions 1421, a plurality of rear fastening portions 1422, and a plurality of side fastening portions 1423 may be provided. FIG. 6 illustrates an example in which eight front fastening portion 1421, four rear fastening portions 1422, and two side fastening portions 1423 are provided. The present disclosure is not limited to the example shown in the figure, and the number of fastening portions provided may vary.

When the panel fastening portion 142 includes the front fastening portion 1421, the rear fastening portion, and the side fastening portion 1423 as described above, the panel fixing portion 139 to which the panel fastening portion 142 is coupled may include a front fixing portion 139a, a rear fixing portion 139b, and a side fixing portion 139c.

The front fixing portion 139a may be formed by penetrating the top surface 13a of the mounting panel. The front fixing portion 139a may be disposed at a position corresponding to the front fastening portion 1421 to fix the front fastening portion 1421.

The rear fixing portion 139b may be formed in the shape of a groove recessed from the top surface 13a of the mounting panel. The side fixing portion 139c may be formed in the shape of a groove recessed from the top surface 13a of the mounting panel.

As described above, the shielding part 14 may include the extension fastening portion 144 connecting the shielding body 141 and the panel support 12. The extension fastening portion 144 may be provided to connect the shielding body 141 and the mounting panel 13. The extension fastening portion 144 may be arranged in parallel with the panel rib 138.

The extension fastening portion 144 may include a shielding part coupling hole 1441 formed through the extension fastening portion 144. The extension fastening portion 144 may be connected to the panel rib 138 and the panel support 12 in a manner in which a coupling member is inserted into the shielding part coupling hole 1441. This coupling structure will be described later.

The mounting panel 13 may include a panel rib 138 connected to the extension fastening portion 144 or the panel support 12. The panel rib 138 may extend downward from the top surface 13a of the mounting panel. In other words, the panel rib 138 may extend from an end of the top surface 13a of the mounting panel facing the extension fastening portion 144 in a direction away from the shielding body 141. That is, the panel rib 138 may be arranged in parallel with the extension fastening portion 144.

The panel rib 138 may include a panel coupling hole 1381 formed through the panel rib 138 in a penetrating manner. The panel rib 138 may be coupled to the extension fastening portion 144 or the panel support 12 by a coupling member arranged through the panel coupling hole 1381. A specific structure of the coupling will be described later.

The shielding part 14 may further include a reinforcing rib 143 to increase the rigidity of the shielding body 141. The reinforcing rib 143 may protrude from the shielding body 141 toward the mounting panel 13. Since the shielding body 141 may be formed in a plate shape, rigidity may not be secured. The reinforcing rib 143 may extend in a direction perpendicular to the surface of the shielding body 141 to increase the rigidity of the shielding body 141.

The reinforcing rib 143 may extend from the extension fastening portion 144 in a direction away from the panel support portion 12. The extension fastening portion 144 may be arranged to be perpendicular to the shielding body 141, and the reinforcing rib 143 may be arranged to be perpendicular to the extension fastening portion 144 and the shielding body 141. That is, the reinforcing rib 143, the shielding body 141, and the extension fastening portion 144 may be arranged to be perpendicular to each other, thereby securing the overall rigidity of the shielding part 14.

The reinforcing ribs 143 may be disposed between the front fastening portions 1421 adjacent to each other. The front fastening portion 1421 may be coupled to the mounting panel 13, and thus a load may be concentrated. Therefore, the reinforcing rib 143 may be disposed between the front fastening portions 1421 to prevent the shielding body 141 from being twisted or deformed by the coupling of the front fastening portion 1421.

The shielding body 141 may include a shielding surface 1411 spaced apart from the mounting panel 13. The shielding surface 1411 may be disposed in parallel with the top surface 13a of the mounting panel to prevent the top surface 13a of the mounting panel from being exposed to the outside.

In addition, the shielding body 141 may include a connection surface 1412 provided to connect the shielding surface 1411 to a surface of the mounting panel 13 exposed to the outside. The connection surface 1412 may extend from the perimeter of the mounting panel 13 toward the corner 13c of the mounting panel. The surface of the mounting panel exposed to the outside may mean the corner 13c of the mounting panel or the top surface 13a of the mounting panel. However, the present disclosure is not limited thereto. The surface of the mounting panel exposed to the outside may refer to all surfaces of the mounting panel that are exposed when the assembly of the laundry treatment apparatus is completed.

In addition, the connection surface 1412 may be provided as a flat surface inclined upward from the mounting panel 13 toward the shielding surface 1411. In addition, the connection surface 1412 may be provided as a curved surface having a preset curvature from the mounting panel 13 toward the shielding surface 1411. In other words, the connection surface 1412 may extend from the perimeter of the shielding surface 1411 toward the mounting panel obliquely or in a curved manner.

Here, "the connection surface 1412 provided as an upwardly inclined surface or a curved surface having a preset curvature" may mean that the cross section of the connection surface 1412 cut in the direction in which the panel inlet 131 is formed (the direction in which the laundry is introduced or drawn out) is "an inclined line or a curved line having a curvature".

In addition, the connection surface 1412 may include a support surface 1413 provided at one end on the side facing away from the shielding surface 1411 to contact and be supported by the mounting panel 13. The support surface 1413 may form a portion of the connection surface 1412. That is, the support surface 1413 may refer to a portion of the connection surface 1412 contacting the mounting panel 13. In addition, the support surface 1413 may support the shielding surface 1411 so as to be spaced apart from the mounting panel 13.

Figure 7:
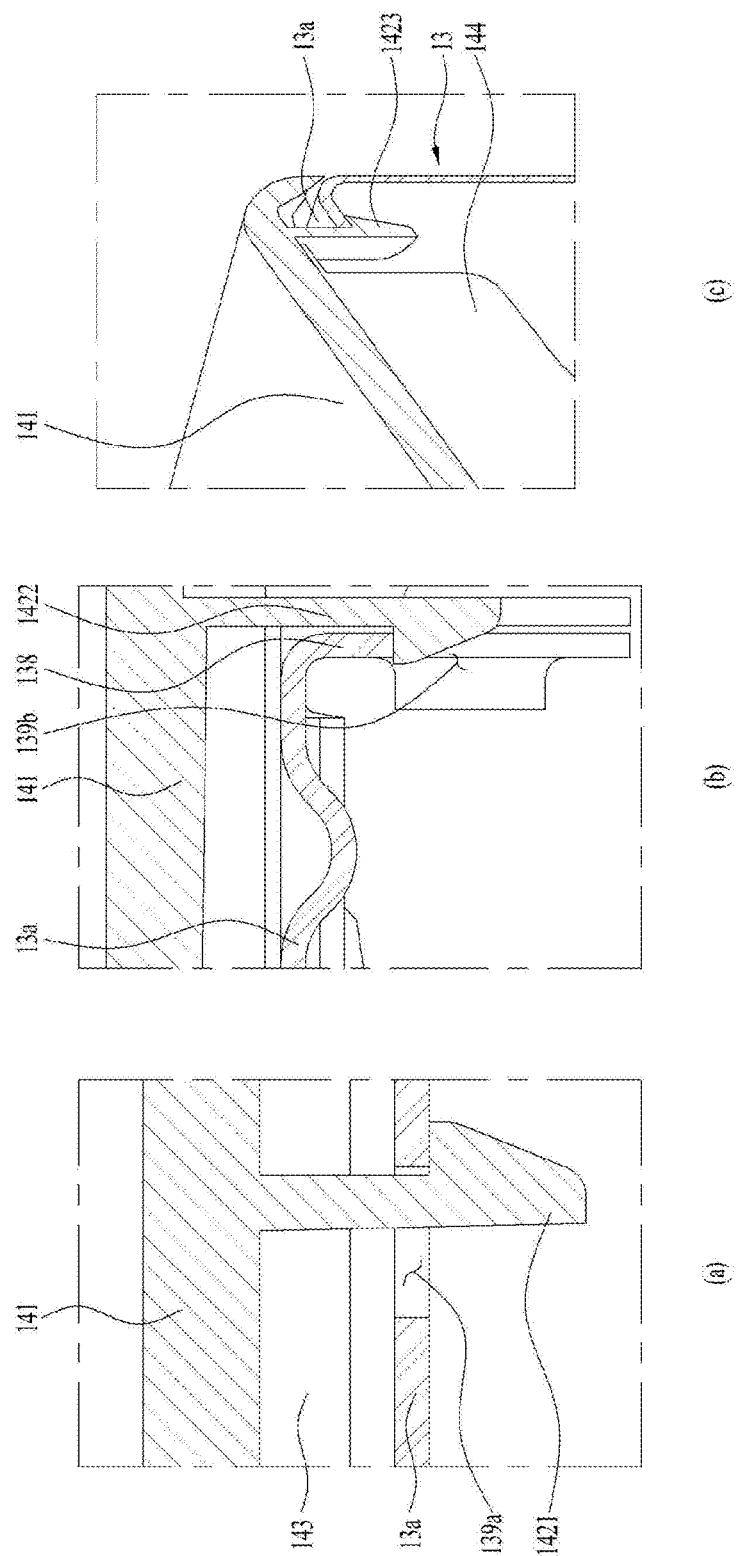
FIG. 7 shows an example of a coupling structure of a panel fastening portion.

FIG. 7 is an enlarged cross-sectional view illustrating coupling between the panel fastening portion 142 and the mounting panel 13.

FIG. 7-(a) illustrates coupling between the front fastening portion 1421 and the front fixing portion 139a, FIG. 7-(b) illustrates coupling between the rear fastening portion 1422 and the rear fixing portion 139b, and FIG. 7-(c) illustrates coupling between the side fastening portion 1423 and the side fixing portion 139c.

Referring to FIG. 7-(a), the front fastening portion 1421 may protrude from the shielding body 141 toward the mounting panel 13. In addition, the front fastening portion 1421 may be formed in a hook shape. The front fixing portion 139a may be formed through the top surface 13a of the mounting panel in a penetrating manner. The front fastening portion 1421 may be inserted into the front fixing portion 139a to be caught and supported on a the bottom of the top surface 13a of the mounting panel.

Referring to FIG. 7-(b), the rear fastening portion 1422 may protrude from the shielding body 141 toward the mounting panel 13. In addition, the rear fastening portion 1422 may be formed in a hook shape. Referring to FIGS. 6-(c) and 7-(b), the rear fixing portion 139b may be bent from the panel rib 138 toward the shielding body 141. The rear fastening portion 1422 may be arranged in parallel with the extension fastening portion 144.

The rear fastening portion 1422 may extend in parallel with the panel rib 138 to be caught and supported by the rear fixing portion 139b. The front fastening portion 1421 may be caught and supported, facing the panel support portion 12. The rear fastening portion 1422 may be caught and supported, facing the panel inlet 131. That is, the front fastening portion 1421 and the rear fastening portion 1422 may be caught and supported, facing each other. Thereby, the shielding body 141 may be firmly coupled to the mounting panel 13.

Referring to FIGS. 7-(c) and 6-(c), the side fastening portion 1423 may protrude from the shielding body 141 toward the mounting panel 13. The side fixing portion 139c may be bent from the top surface of the mounting panel 13 in a direction away from the extension fastening portion 144. The side fastening portion 1423 may be caught and supported on the bottom of the top surface 13a of the mounting panel.

The side fastening portions 1423 may be arranged on both side surfaces of the shielding body 141, respectively, and may be coupled to both side surfaces of the mounting panel 13, respectively. In addition, the side fastening portions 1423 may be disposed between the extension fastening portion 144 and the cover panel 111. The side fastening portions 1423 may support the shielding body 141 on the mounting panel 13 in a direction perpendicular to the front fastening portion 1421 and the rear fastening portion 1422 to enhance the coupling of the shielding body 141.

Figure 8:
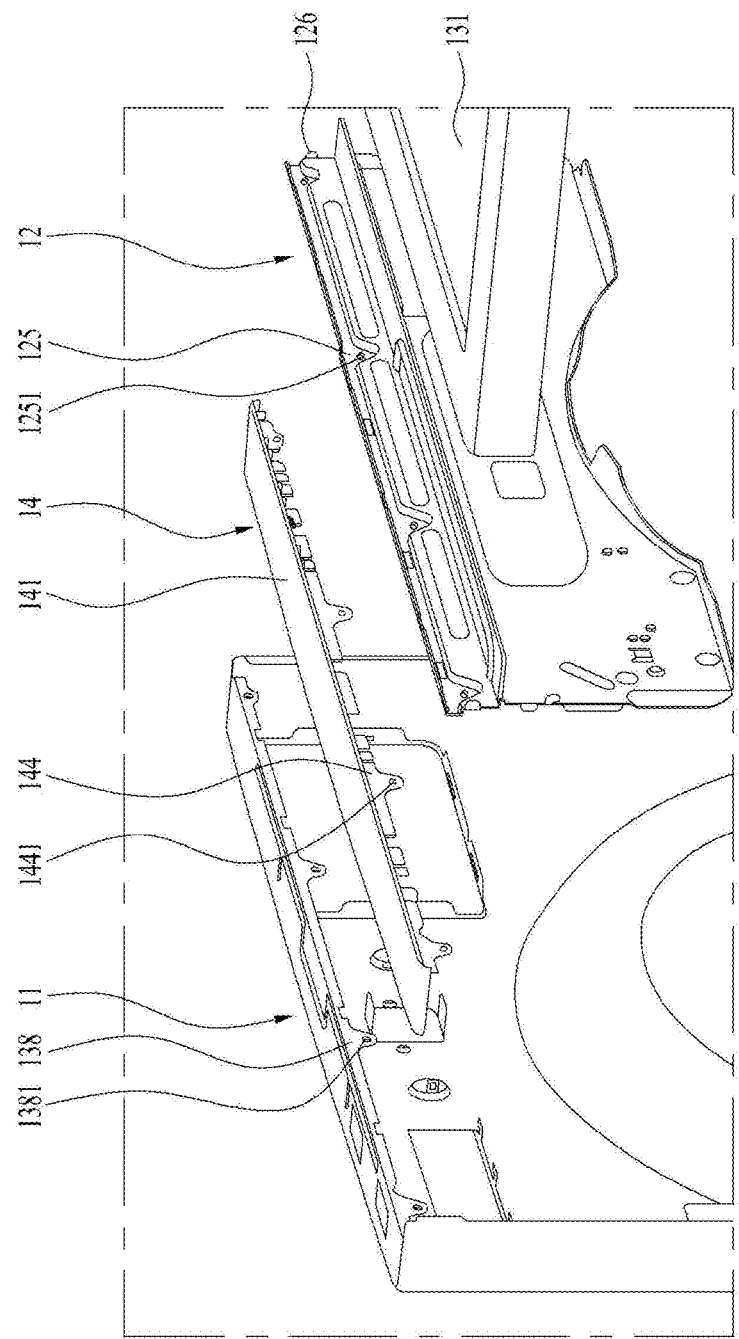
FIG. 8 is an exploded perspective view of a mounting panel, a shielding part, a panel support, and a cabinet body.

FIG. 8 is an exploded perspective view of a mounting panel, a shield, a panel support, and a cover panel;

Referring to FIG. 8, the shielding part 14 may be coupled to the mounting panel 13, and the panel support 12 may be coupled to the shielding part 14. The assembly of the mounting panel 13, the shielding part 14, and the panel support 12 may be coupled to the cover panel 111.

In particular, the panel rib 138 provided on the mounting panel 13 and the extension fastening portion 144 provided in the shielding part 14 may be coupled to each other. Also, the extension fastening portion 144 and the panel support 12 may be coupled to each other.

The panel support portion 12 may further include a support coupling portion 125 coupled to the extension fastening portion 144. The support coupling portion 125 may be provided at an upper side of the panel support 12. The support coupling portion 125 may be disposed under the shielding body 141.

When the assembly of the laundry treatment apparatus is completed, the support coupling part 125 may be disposed to be surrounded by the shielding body 141, the extension fastening portion 144, and the cover panel 111. Accordingly, the support coupling portion 125 may be prevented from being exposed to the outside.

An electronic device may be installed on one surface of the panel support 12. Accordingly, the support coupling portion 125 may be prevented from being exposed to the outside by the shielding part 14 and the cover panel 111, thereby preventing moisture or foreign substances from being introduced into the electronic device.

The panel support 12 may include a support coupling hole 1251 formed through the support coupling portion 125 in a penetrating manner. The support coupling hole 1251 may be used for coupling to the extension fastening portion 144 or the mounting panel 13. The support coupling hole 1251 may be spaced apart from the upper end of the panel support 12 by a predetermined distance in order to prevent the panel support 12 from being damaged by a tool during an assembly process. A specific coupling structure of the support coupling hole 1251 will be described later.

The panel support 12 may also include a support coupling protrusion 126 to be fixed to the cabinet body 11. The panel support 12 may be coupled to the cabinet body 11 by the support coupling protrusion 126. Specifically, the support coupling protrusion 126 may be coupled to the cover panel 111. A specific coupling structure thereof will be described later.

Figure 9:
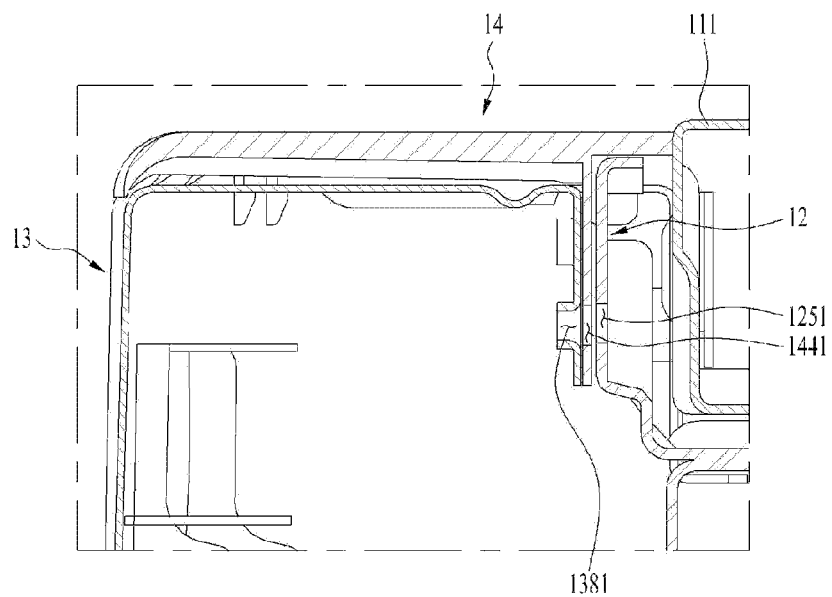
FIG. 9 shows an example of a coupling structure of a mounting panel, a shielding part, and a panel support.
Figure 9:
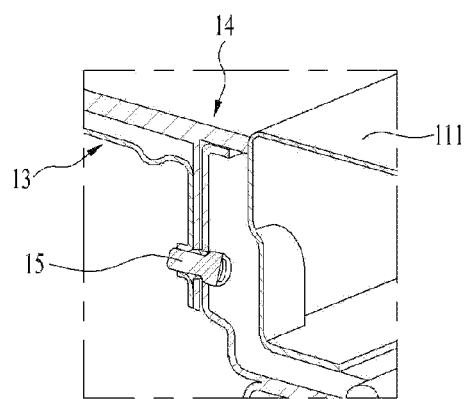
Figure 9:
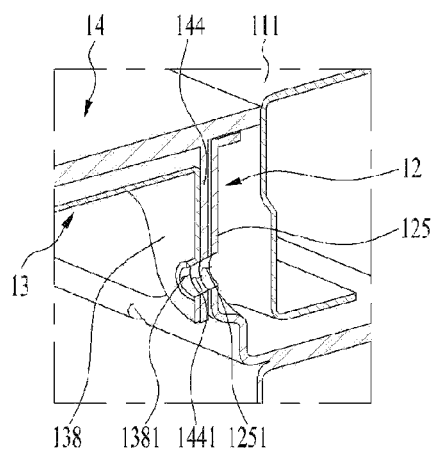

FIG. 9 shows a cross section of the mounting panel 13, the shielding part 14, the panel support 12, and the cabinet body 11 which are coupled to each other.

FIG. 9-(a) shows a cross section taken in a vertical direction. FIG. 9-(b) shows the cross section seen on the cabinet body side. FIG. 9-(c) shows the cross section seen on the mounting panel side.

Referring to FIG. 9, as described above, the extension fastening portion 144 is positioned between the mounting panel 13 and the panel support 12. In addition, the panel coupling hole 1381 may be formed through the panel rib 138 in a penetrating manner. The shielding part coupling hole 1441 may be formed through the extension fastening portion 144 in a penetrating manner. The shielding part coupling hole 1441 may communicate with the panel coupling hole 1381. In addition, the support coupling hole 1251 may be formed through the support coupling portion 125 in a penetrating manner. In addition, the support coupling hole 1251 may communicate with the shielding part coupling hole 1441.

That is, the panel coupling hole 1381, the shielding part coupling hole 1441, and the support coupling hole 1251 may communicate with each other. The panel coupling hole 1381, the shielding part coupling hole 1441, and the support coupling hole 1251 may be provided with a coupling member 15 arranged through the panel coupling hole 1381, the shielding part coupling hole 1441, and the support coupling hole 1251 in a penetrating manner.

The mounting panel 13, the shielding part 14, and the panel support 12 may be firmly coupled by the coupling member 15. The coupling member 15 may include a bolt and a nut. The coupling member 15 may tightly couple the panel rib 138, the extension fastening portion 144, and the support coupling portion 125. Accordingly, the space between the mounting panel 13 and the panel support 12 may be prevented from being exposed to the outside by the shielding part 14.

As described above, the coupling member 15 may be provided as a member to be bolted, but is not limited thereto. Various coupling elements capable of firmly fixing the components may be used.

The cabinet body 11 may be positioned on a side of the panel support 12 facing away from the mounting panel 13. Specifically, the cover panel 111 may be positioned on a side of the support coupling portion 125 facing away from the mounting panel 13.

Figure 10:
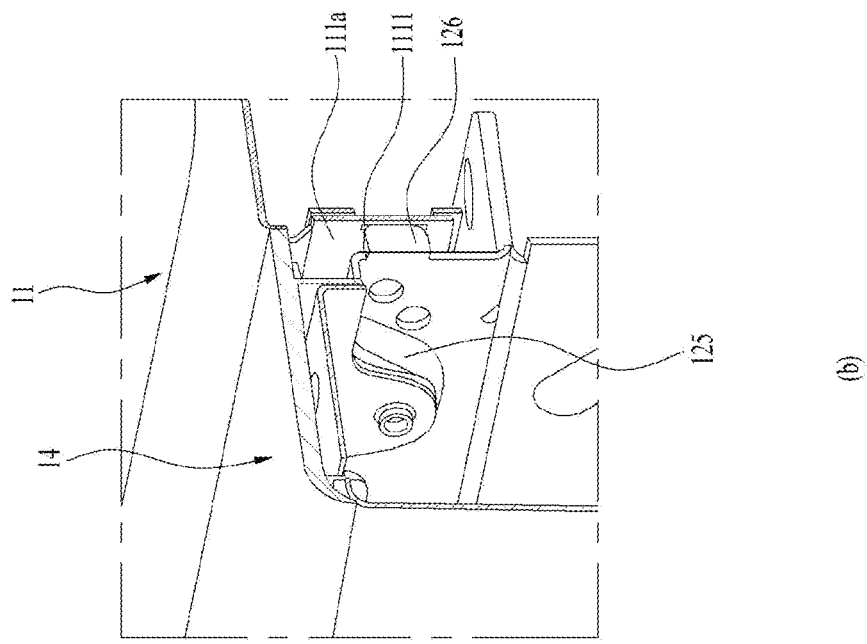
FIG. 10 shows an example of a coupling structure of a panel support and a cover panel.
Figure 10:
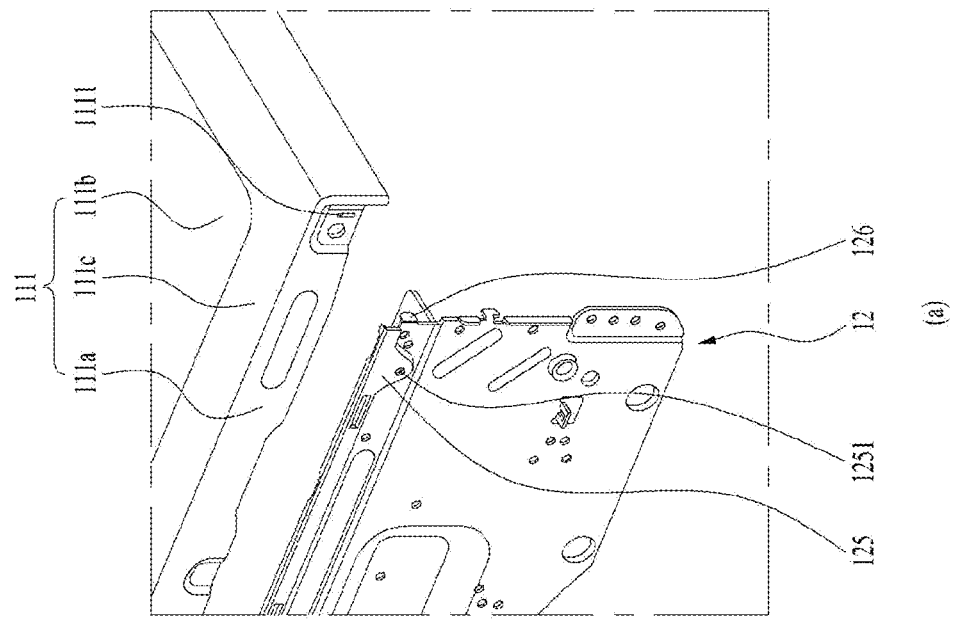

FIG. 10 shows a coupling structure of a panel support and a cover panel.

Referring to FIG. 10, the cover panel 111 may further include a protrusion insertion groove 1111 into which the support coupling protrusion 126 is inserted. The protrusion insertion groove 1111 may be formed through the cover panel 111 in a penetrating manner. In particular, the cover panel 111 may include a front surface 111a of the cover panel disposed on a side facing the panel support 12. The protrusion insertion groove 1111 may be formed through the front surface 111a of the cover panel in a penetrating manner.

The protrusion insertion groove 1111 may be provided in the front surface 111a of the cover panel at a position corresponding to the support coupling protrusion 126. The support coupling protrusion 126 may be inserted into and supported by the protrusion insertion groove 1111.

The support coupling protrusion 126 may extend from the support coupling portion 125 in a direction away from the extension fastening portion 144. Specifically, the support coupling protrusion 126 may be provided at a side end portion of the support coupling portion 125. Accordingly, the protrusion insertion groove 1111 may also be provided at a side portion of the front surface 111a of the cover panel. A plurality of support coupling protrusions 126 and a plurality of protrusion insertion grooves 1111 may be provided. The figure illustrates an example in which two support coupling protrusions 126 and two protrusion insertion grooves 1111 are provided on both side surfaces of the clothes treatment apparatus, respectively.

However, the present disclosure is not limited to the illustrated example. Various numbers of protrusions and grooves may be provided to couple the panel support 12 and the cover panel 111.

Figure 11:
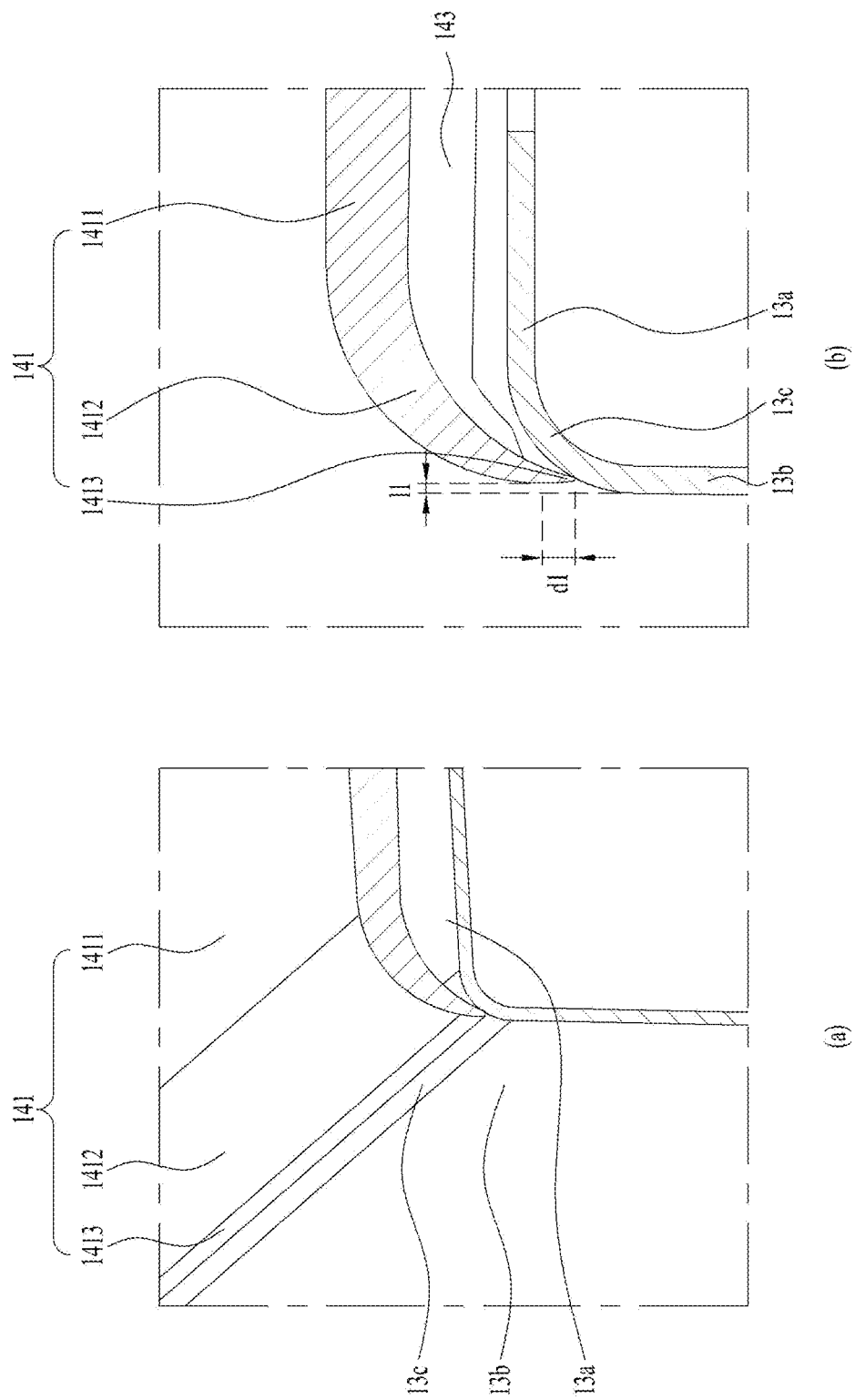
FIG. 11 is an enlarged view of a coupling structure of a shielding body and a mounting panel.

FIG. 11 is a cross-sectional perspective view and a cross-sectional view illustrating a shielding part and a mounting panel coupled to each other. FIG. 11-(a) shows a cross section viewed from the front side, and FIG. 11-(b) shows a cross-sectional view.

Referring to FIG. 11-(a), as described above, the mounting panel 13 may include the front surface 13b of the mounting panel in which the panel inlet 131 is formed. In addition, the mounting panel 13 may include the top surface 13a of the mounting panel facing the shielding part 14. The top surface 13a and the front surface 13b of the mounting panel may be connected orthogonally to each other. The mounting panel 13 may include the corner 13c of the mounting panel connecting the top surface 13a of the mounting panel to the front surface 13b of the mounting panel.

The mounting panel 13 may be manufactured by folding one steel plate. That is, it may be manufactured in a bending manner. Accordingly, the corner 13c of the mounting panel 13 may have a predetermined curvature.

The shielding body 141 may include a shielding surface 1411 arranged spaced apart from the mounting panel. The shielding surface 1411 may be arranged in parallel with the top surface 13a of the mounting panel. In addition, the shielding body 141 may include a connection surface 1412 extending from the perimeter of the shielding surface 1411 toward the mounting panel 13.

The connection surface 1412 may connect the shielding surface 1411 to a surface of the mounting panel 13 exposed to the outside. The surface of the mounting panel 13 exposed to the outside may refer to the corner 13c of the mounting panel. However, the present disclosure is not limited thereto. The connection surface 1412 may connect the shielding surface 1411 to the top surface 13a of the mounting panel.

However, when the shielding body 141 is coupled to the mounting panel 13, it may be preferable that the connection surface 1412 is arranged to connect the shielding surface 1411 to the corner 13c of the mounting panel in order to improve integrity. In the figure, the connection surface 1412 is shown to connect the shielding surface 1411 to the corner 13c of the mounting panel.

The connection surface 1412 may be provided as a curved surface having a predetermined curvature or as a flat surface inclined upward from the mounting panel 13 toward the shielding surface 1411. In other words, the connection surface 1412 may smoothly connect the mounting panel 13 and the shielding surface 1411 to improve integrity. In addition, the connection surface 1412 may be provided to be inclined or have a curvature, thereby prevent clothes from being caught and damaged by the connection surface 1412 or prevent the user from being injured.

The connection surface 1412 may connect the shielding surface to the corner 13c of the mounting panel. Thus, it may be in contact with and supported by the corner 13c of the mounting panel. The connection surface 1412 may extend from a portion of the perimeter of the shielding surface 1411. Specifically, the connection surface 1412 may extend from the perimeter of the shielding surface 1411 except for a portion having the extension fastening portion 144.

For example, when it is assumed that the shielding surface 1411 is formed in a rectangular shape, the connection surface 1412 may extend toward the mounting panel 13 from the sides of the four sides of the shielding surface 1411 except one side adjacent to the cabinet body 11. Accordingly, the shielding surface 1411 may be supported by the connection surface 1412 so as to be spaced apart from the mounting panel 13.

The connection surface 1412 may be formed to be convex in a direction away from the mounting panel 13. As the connection surface 1412 extends from the shielding surface 1411 toward the mounting panel 13, the inclination may increase. Accordingly, one end of the connection surface 1412 positioned on a side facing away from the shielding surface 1411 may be arranged in parallel with the front surface 13*b* of the mounting panel.

The connection surface 1412 may further include a support surface 1413 supported by the mounting panel 13. The support surface 1413 may be provided at one end facing away from the shielding surface 1411 and may thus be in contact with and supported by the mounting panel 13.

That is, a portion of the connection surface 1412 contacting the mounting panel 13 may be defined as the support surface 1413.

The support surface 1413 may be positioned closer to the cabinet body 11 than one surface of the mounting panel 13 provided with the panel inlet 131. In other words, the support surface 1413 may be positioned closer to the cabinet body 11 than the front surface 13*b* of the mounting panel. The support surface 1413 may form one end of the shielding body 141. This configuration may prevent clothing from getting caught on the end of the shielding body 141 and damaged, or a user's fingers from getting caught and injured.

In the case where the support surface 1413 is excessively spaced apart from the front surface 13*b* of the mounting panel, the aesthetics of the laundry treatment apparatus may be lowered. Accordingly, the distance 11 between the front surface 13*b* of the mounting panel and the support surface 1413 may be set to be greater than 0.1 mm and less than 0.5 mm in order to improve the integrity of the mounting panel 13 and the shielding part 14 felt by the user.

When the support surface 1413 is positioned closer to the cabinet body 11 than the front surface 13*b* of the mounting panel, the support surface 1413 may be positioned at the corner 13*c* of the mounting panel. That is, the support surface 1413 may be provided in parallel with the front surface 13*b* of the mounting panel to be in contact with and supported by the corner 13*c* of the mounting panel. In other words, the shielding body 141 is arranged to partially cover the corner 13*c* of the mounting panel, thereby increasing the aesthetics of the laundry treatment apparatus.

In addition, the connection surface 1412 may have a preset inclination, and the support surface 1413, which is a portion contacting the mounting panel 13, may be arranged in parallel with one surface of the mounting panel 13 provided with the panel inlet 131. That is, only the support surface 1413 may be arranged in parallel with the front surface 13*b* of the mounting panel.

As the support surface 1413 is arranged in parallel with the front surface 13*b* of the mounting panel, one portion of the support surface 1413 exposed to the outside is arranged in parallel with the front surface 13*b* of the mounting panel.

Here, a portion of the connection surface 1412 corresponding to the support surface 1413 may refer to a portion having a preset length from a point in contact with the mounting panel 13 to a side away from the mounting panel 13. The length d1 of the support surface 1413 described above may be greater than or equal to 0.1 mm and less than or equal to 1 mm.

When the support surface 1413 is provided in parallel with the front surface 13*b* of the mounting panel by the preset length, the connection surface 1412 and the mounting panel 13 may be prevented from being spaced apart from each other by the curvature of the connection surface 1412. Accordingly, clothes may be prevented from being stuck in the gap between the shielding body 141 and the mounting panel 13.

Figure 12:
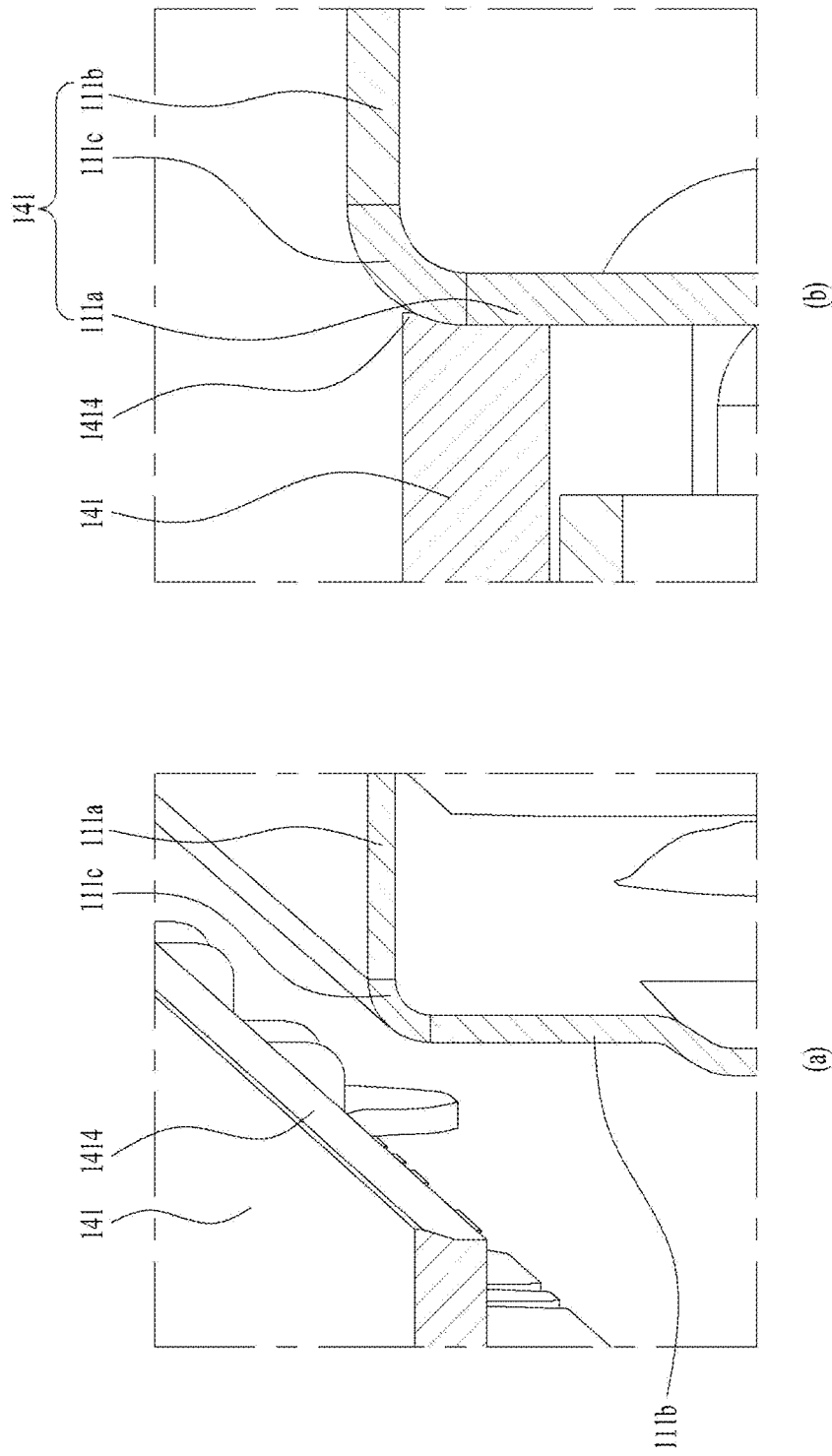
FIG. 12 is an enlarged view of a coupling structure of a shielding body and a cover panel.

FIG. 12 is a cross-sectional view showing portions of the shielding body and the cabinet body in contact with each other. FIG. 12-(*a*) is a perspective view showing a cross section seen in a direction from the cabinet body toward the mounting panel, and FIG. 12-(*b*) is a cross-sectional view taken in a vertical direction.

Referring to FIG. 12, the shielding body 141 may further include an extension surface 1414 provided to prevent a space between the panel support 12 and the cabinet body 11 from being exposed to the outside. In particular, the extension surface 1414 may extend from the shielding surface 1411 toward the cover panel 111. The extension surface 1414 may prevent the space between the panel support 12 and the cover panel 111 from being exposed to the outside.

The extension surface 1414 may be in contact with and supported by the cover panel 111. In particular, the extension surface 1414 may be in contact with and supported by a corner 111*c* of the cover panel. One end of the extension surface 1414 contacting the cover panel 111 may have a shape corresponding to the corner 111*c* of the cover panel. That is, one end of the extension surface 1414 may contact the front surface 111*a* of the cover panel and the corner 111*c* of the cover panel. The upper side of the one end may have a curvature to correspond to the corner 111*c* of the cover panel, and the lower side of the one end may be provided as a flat surface to correspond to the front surface 111*a* of the cover panel.

When the extension surface 1414 is configured as described above, the shielding body 141 may contact the cover panel 111 more closely. Accordingly, the shielding body 141 may effectively prevent foreign substances from being introduced into the space between the panel support 12 and the cover panel 111. Additionally, when the extension surface 1414 has a shape corresponding to the cover panel 111, the integrity of the outer appearance of the laundry treatment apparatus may be improved, and thus aesthetics may be improved.

Figure 13:
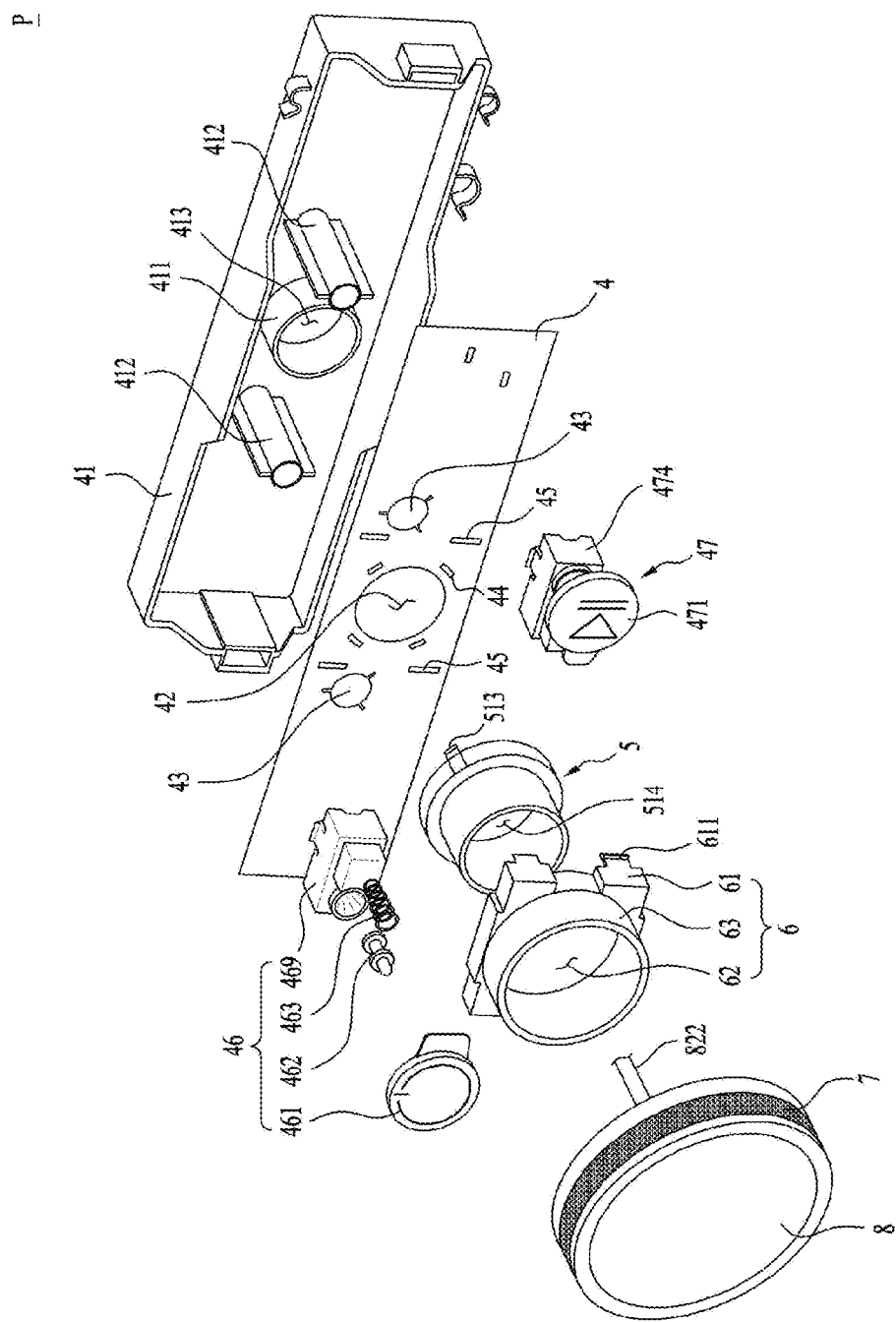
FIG. 13 shows a structure of an interface.

As shown in FIG. 13, the interface P may include a circuit board (first circuit board) 4 disposed inside the cabinet 1, an encoder 5 fixed to the circuit board and disposed inside the cabinet 1, an actuator 7 connected to the encoder 5 through the mounting panel 13, and an indicator 8 fixed to the encoder 5 or the first circuit board 4 through the mounting panel 13.

The first circuit board 4 is a substrate on which control circuits necessary for the control (power control or operation control) of at least one of the drive unit 32, the water supply valve 233 and the pump 252 are arranged, and may be fixed to the mounting panel 13 or the panel support 12 through a case 41.

The case 41 may have any shape as long as it allows the first circuit board 4 to be fixed to the mounting panel 13 or the panel support 12. FIG. 13 illustrates an example of the case 41 formed in the shape of a hexahedron with one side (the side facing the panel support) open.

The case 41 may be provided with a boss for positioning the first circuit board 4. FIG. 13 illustrates an example case where the boss includes a first boss 411 and a second boss 412. In this case, the first circuit board 4 may include a board through-hole 42 through which the first boss 411 is arranged, and a boss insertion hole 43 through which the second boss 412 is arranged. The second boss 412 may be disposed in the space on both left and right sides of the first boss 411, or may be disposed in the space on both top and bottom sides of the first boss 411.

The display part 8 is connected to a wire 822. The wire 822 may be configured as a power line to supply power to the display part, or may be configured as a communication line to allow the display part 8 to communicate with devices inside the cabinet, including the first circuit board 4.

The first boss 411 may be provided with a first boss through-hole 413, and the panel support 12 may be provided with a wire passing hole 123 (see FIG. 4). In this case, the wire 822 may extend into the cabinet 1 as it is inserted into the first boss through-hole 413 and the wire passing hole 123.

The first circuit board 4 may further include a first input unit 46 and a second input unit 47. The first input unit 46 may be configured to input a control instruction requesting power supply to the laundry treatment apparatus 100, and the second input unit 47 may be configured to input an instruction requesting execution of the control instruction indicated on the display part 8, or an instruction requesting temporary suspension of the control instruction being executed by the laundry treatment apparatus 100.

The first input unit 46 and the second input unit 47 may be configured to generate a control signal by sensing static electricity of the user's body.

The first input unit 46 may include a first button 461 exposed to the outside of the cabinet 1, a first sensor 464 fixed to the first circuit board 4, and a conductor (first touch spring) 463 connecting the first button and the first sensor. Similarly, the second input unit 47 may include a second button 471 exposed to the outside of the cabinet 1, a second sensing sensor 474 fixed to the first circuit board 4, and a conductor (second touch spring) (not shown) connecting the second button and the second sensing sensor.

As shown in FIG. 3, the mounting panel 13 may include a first button mounting portion 136 and a second button mounting portion 137. The first button 461 may be exposed to the outside of the cabinet 1 through the first button mounting portion 136, and the second button 471 may be exposed to the outside of the cabinet 1 through the second button mounting portion 137.

The first input unit 46 and the second input unit 47 may be disposed in the spaces on the left and right sides of the display part 8, respectively, or may be disposed in the spaces on the top and bottom sides of the display part 8, respectively. Alternatively, they may be vertically or horizontally arranged in the space on the left or right side of the display part 8.

As shown in FIG. 13, the first touch spring 463 and the second touch spring may be provided in the form of a coil, in order to provide resilience to the first button 461 and the second button 471. Further, in order to prevent the first button 461 and second button 471 from being separated from the button mounting portions 136 and 137, the first input unit 46 may be provided with a first stopper 462 to limit the range of motion of the first button, and the second input unit 47 may be provided with a second stopper (not shown) to limit the range of motion of the second button.

The encoder 5 is configured to rotatably secure the actuator 7 to the first circuit board 4 and to generate an electrical signal upon rotation of the actuator 7 (or generate an electrical signal set differently according to a rotation angle of the actuator).

Figure 14:
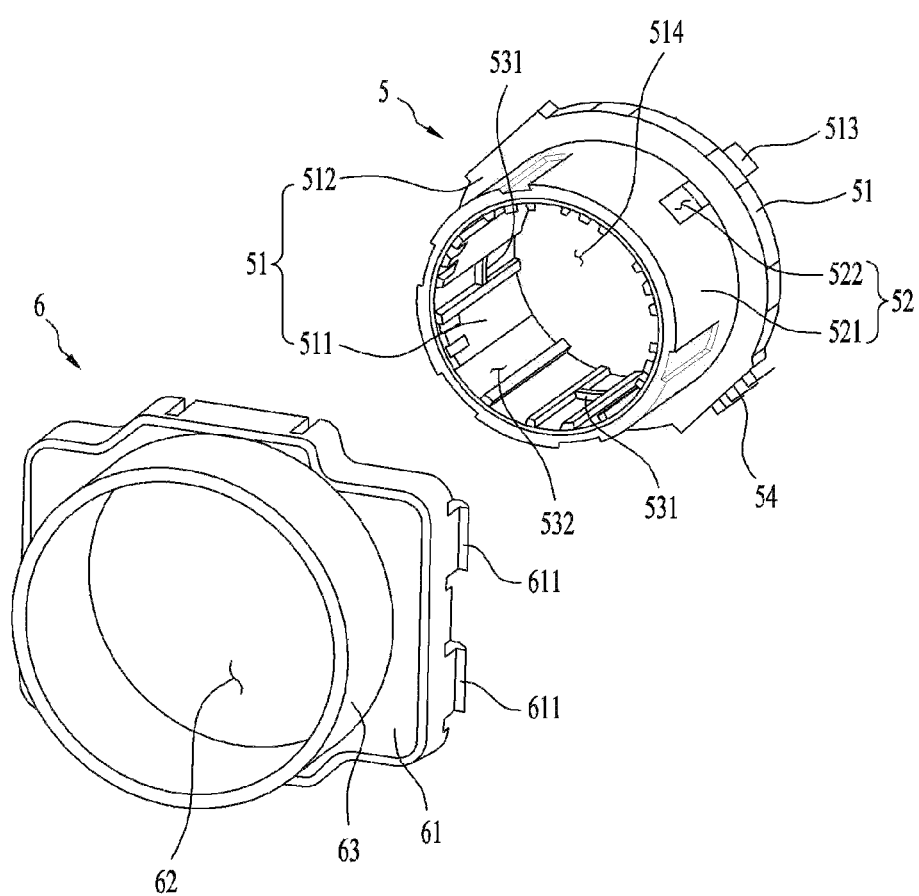
FIGS. 14 and 15 show an example of an encoder and an encoder cover provided in the interface.

As shown in FIG. 14, the encoder 5 may include a fixed part 51 fixed to the first circuit board 4 such that the display part 8 is fixed thereto, a rotary part 52 rotatably arranged on the fixed part 51 with the actuator 7 fixed thereto, and a signal generator 54 configured to generate an electrical signal upon rotation of the rotary part 52.

The fixed part 51 may include a fixed body 512 fixed to the first circuit board 4, a support body 511 extending from the fixed body 512, the rotary part 52 being rotatably fixed to the support body, and a body through-hole 514 formed through the fixed body and the support body and connected to the board through-hole 42 (and connected to the first boss through-hole).

The fixed body 512 may be formed in a cylindrical shape. The circumferential surface of the fixed body 512 or one surface of the fixed body (the surface facing the first circuit board) may be provided with a board fastening portion 513. In this case, the first circuit board 4 may be provided with an encoder fixing hole 44 (see FIG. 13) into which the board fastening portion 513 is inserted.

As shown in FIG. 13, multiple substrate fastening portions 513 and multiple encoder fixing holes 44 may be provided, and the encoder fixing holes 44 may be arranged to surround the board through-hole 42.

As shown in FIG. 14, a fastening body fixing portion 531 and a positioning groove 532 may be provided inside the body through-hole 514. The fastening body fixing portion 531 may fasten the display part 8 to the fixed part 51. The positioning groove 532 may prevent the display part 8 from rotating (to fix the position of the display part) when the display part 8 is inserted into the body through-hole 514.

The fastening body fixing portion 531 may be provided with a protrusion protruding from at least one of the support body 511 and the fixed body 512 toward the center of the body through-hole 514. The figure shows an example case where the fastening body fixing portion 531 is provided on the support body 511.

The positioning groove 532 may be formed by concavely bending one surface of the fixed part 51 having the body through-hole 514. In this case, the positioning groove 532 may be arranged along the longitudinal direction of the body through-hole 514.

The rotary part 52 may include a rotational body 521 rotatably coupled to the support body 511. The rotational body 521 needs to have a rotational body through-hole through which the support body 511 is arranged.

The rotational body 521 may be provided with a shaft fastening portion 522 to which the actuator 7 is fastened. The shaft fastening portion 522 may be a fastening hole formed through the circumferential surface of the rotational body 521, or may be a fastening groove formed by concavely bending the circumferential surface of the rotational body 521.

The signal generator 54 may include a magnet fixed to the rotational body 521, a sensor arranged on the fixed body 512 or the support body 511 to sense magnetic force, and a terminal connecting the sensor and the first circuit board 4. The magnet may include a plurality of permanent magnets spaced apart along the circumferential surface of the rotational body 521.

Figure 15:
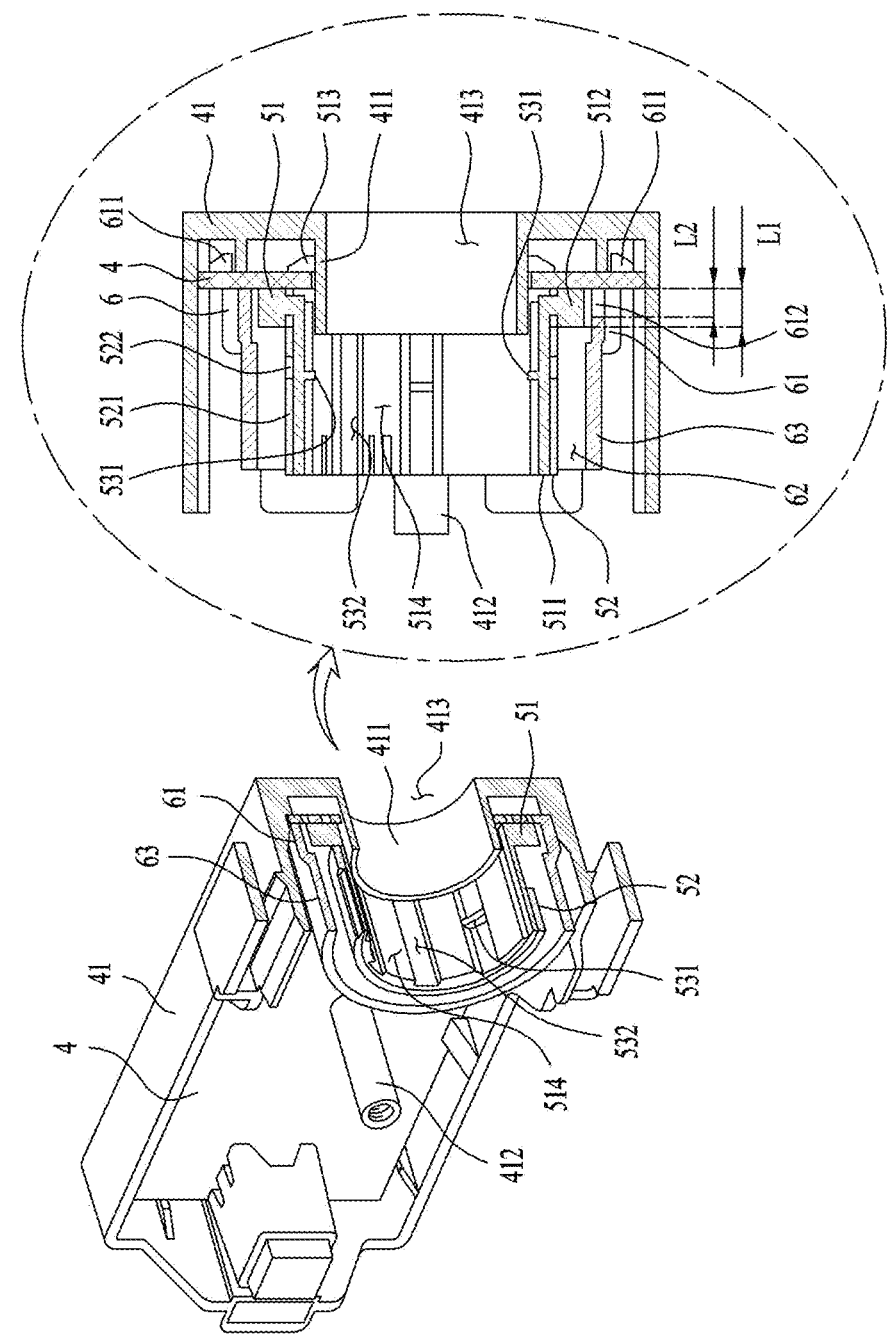

As shown in FIG. 15, the first circuit board 4 to which the encoder 5 is connected may be coated with an insulating material. The coating is intended to minimize the possibility that water is supplied to the first circuit board 4 to cause short circuiting. To prevent the rotational body 521 from being fixed to the support body 511 by the insulating material when the insulating material is applied onto one surface (the surface facing the mounting panel) of the first circuit board 4, the interface P may further include an encoder cover 6.

The encoder cover 6 may be fixed to the first circuit board 4 and formed in a pipe shape to surround the encoder 5. That is, as shown in the figure, the encoder cover 6 may include a fixed body cover 61 fixed to the first circuit board 4 and arranged to surround the fixed body 512, and a cover through-hole 62 formed through the fixed body cover 61 to receive the encoder 5 inserted thereinto.

The fixed body cover 61 may be provided with a board fastening portion 611, and the first circuit board 4 may be provided with an encoder cover fixing hole 45, to which the board fastening portion 611 is fixed. Multiple board fastening portions 611 and multiple encoder cover fixing holes 45 may be provided, and the encoder cover fixing holes 45 may be arranged to surround the board fastening portion 513.

In order to discharge water introduced into the fixed body cover 61, a cover outlet 612 may be further provided on the circumferential surface of the fixed body cover 61. The cover outlet 612 is preferably disposed at the lowermost end of the circumferential surface of the fixed body cover 61.

The above-described insulating material is applied to the first circuit board 4 after both the encoder 5 and the encoder cover 6 are coupled to the first circuit board 4. The insulating material sprayed onto a partial region of the first circuit board 4 (the space outside the encoder cover) is introduced into the encoder cover 6 through the cover outlet 612. In this process, the distance L1 from the first circuit board to the top of the fixed body 512 may be set to be greater than or equal to the distance L2 from the first circuit board to the top of the cover outlet 612 such that the insulating material is blocked from being supplied to the rotational body 521.

The encoder cover 6 may further include a support body cover 63 extending from the fixed body cover 61 to surround the rotational body 521 (to surround the support body). The support body cover 63 may restrict movement of the actuator 7 in the radial direction of the cover through-hole 62. Accordingly, the support body cover 63 may prevent the actuator 7 from being separated from the rotational body 521.

Figure 16:
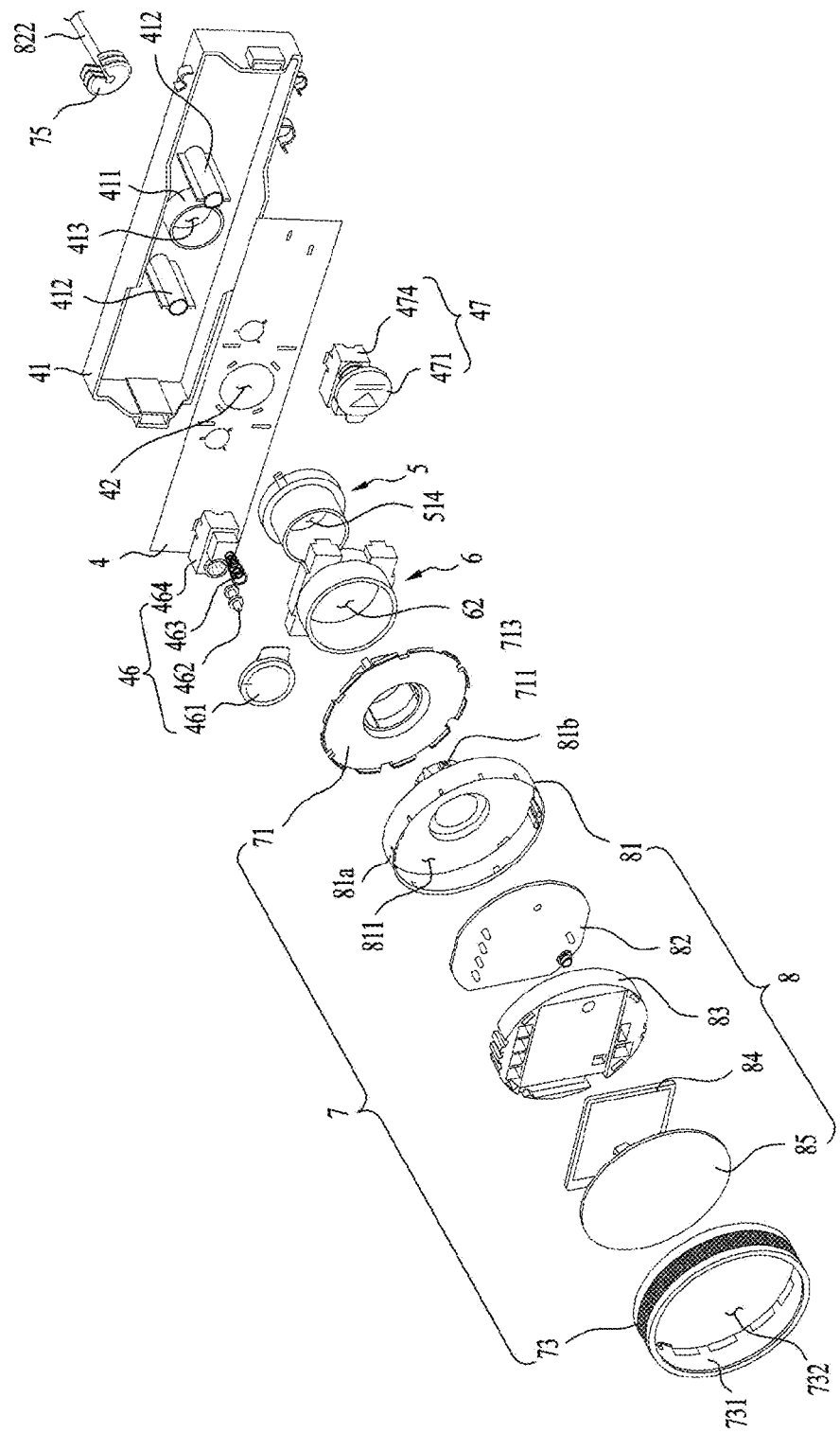
FIG. 16 shows an example of an actuator and a display part provided in the interface.

As shown in FIG. 16, the actuator 7 may include a shaft 71 extending through the mounting panel 13 and fixed to the rotational body 521, and a handle 73 fixed to the shaft 71 and positioned outside the cabinet 1.

The cabinet 1 is provided with the panel through-hole 134 (see FIG. 3) formed through the mounting panel 13, and the shaft 71 may be inserted into the panel through-hole 134.

Figure 17:
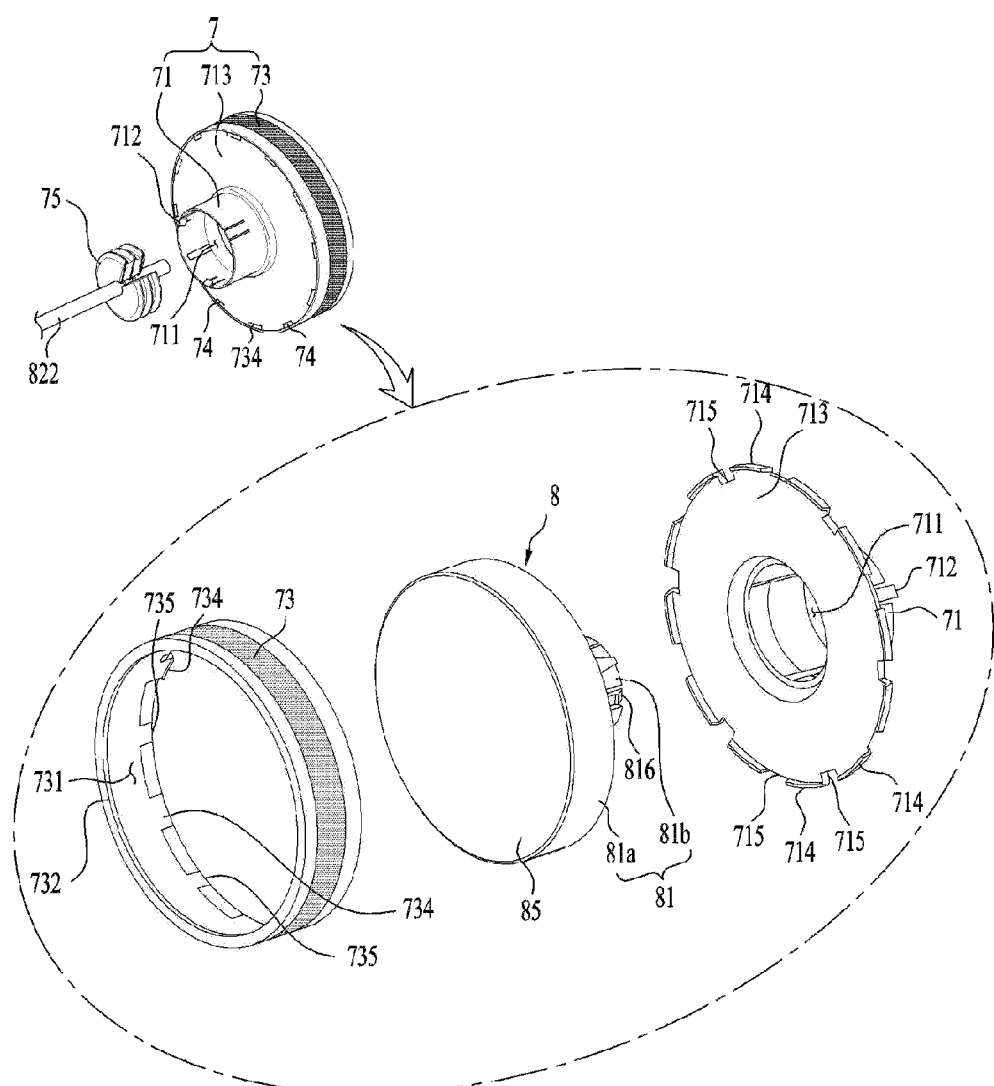
FIGS. 17 and 18 show a structure of the actuator.

As shown in FIG. 17, the shaft 71 may be provided as a pipe with a shaft through-hole 711 formed therein. The rotational body 521 provided in the encoder is inserted into the shaft through-hole 711, and the rotational body fastening portion 712 provided on the circumferential surface of the shaft 71 and disposed inside the shaft through-hole 711 is coupled to the shaft fastening portion 522 provided on the rotational body. Accordingly, the shaft 71 is fixed to the rotational body 521 by the rotational body fastening portion 712 and the shaft fastening portion 522.

The handle 73 is fixed to the shaft 71 so as to be disposed outside the cabinet 1, and the user may apply the force for rotation of the rotational body 521 to the shaft 71 using the handle 73.

The handle 73 may include an accommodation space 731 formed in the handle to communicate with the shaft through-hole 711, and a handle through-hole 732 formed through one surface of the handle 73 to allow the accommodation space 731 to communicate with the outside.

When the diameter of the handle 73 is set to be greater than the diameter of the shaft 71, the shaft 71 may further include a base 713 to which the handle 73 is fixed. The base 713 may be configured as a disk fixed to the circumferential surface of the shaft 71.

The handle 73 and the base 713 may be coupled to each other by a base fastening portion 734 provided on the handle 73 and a handle fastening portion 714 provided on the base 713.

Figure 18:
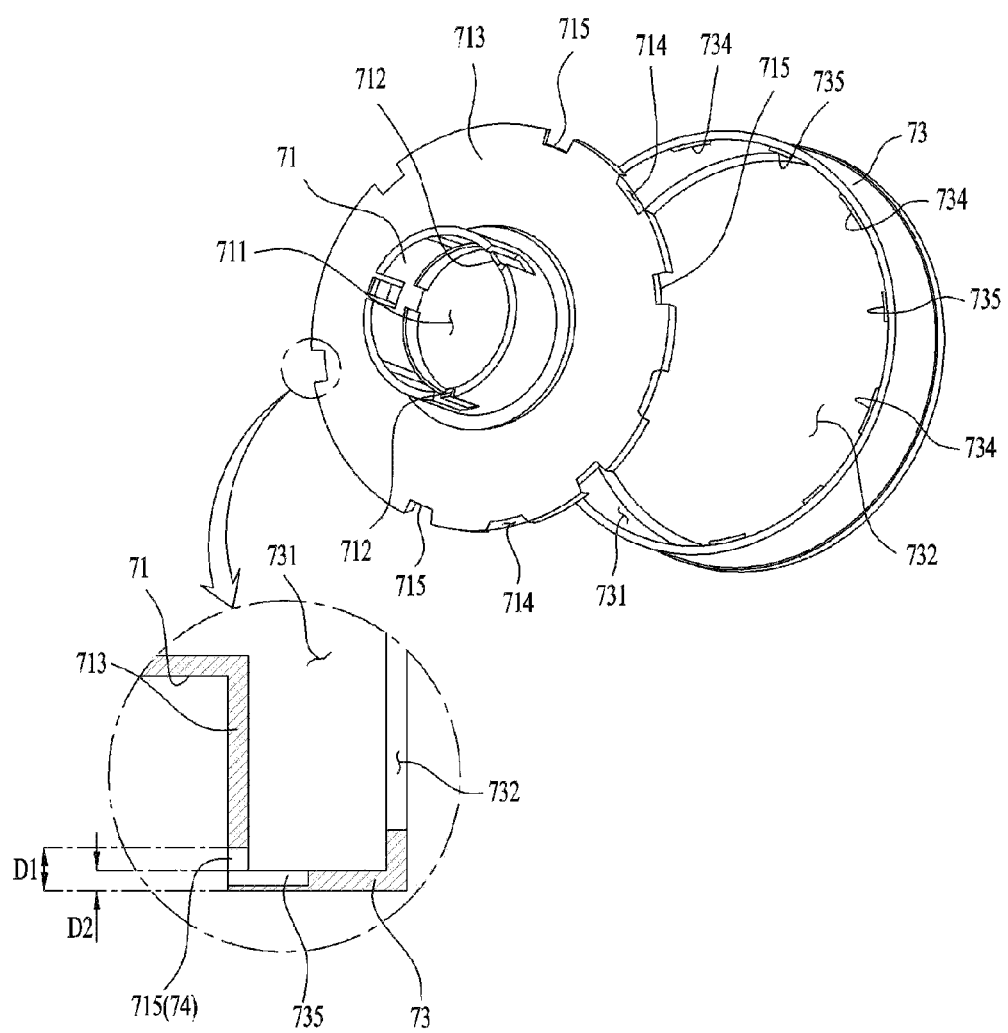

As shown in FIG. 18, the base fastening portion 734 may be provided with multiple protrusions fixed to the handle so as to be positioned in the accommodation space 731, and the handle fastening portion 714 may be configured as a groove provided on the base 713 to accommodate the protrusions.

In order to facilitate coupling of the handle 73 and the base 713, the handle 73 may have a fastening guide 735 disposed between one base fastening portion 734 and another base fastening portion 734, and the base 713 may have a guide groove 715 into which the fastening guide 735 is inserted. The guide groove 715 may be provided by bending the circumferential surface of the base 713 toward the shaft through-hole 711.

A handle outlet 74 may be further provided in either the handle 73 or the base 713 to discharge water or foreign substances introduced into the handle 73 from the handle 73. As shown in FIG. 18, the depth D1 of the guide groove 715 (the length from the edge of the base to the bottom surface of the guide groove) may be set to be greater than the height D2 of the fastening guide 735 (the length from the handle to the free end of the fastening guide). In this case, the handle outlet 74 may be set as a space defined between the guide groove 715 and the fastening guide 735.

Figure 19:
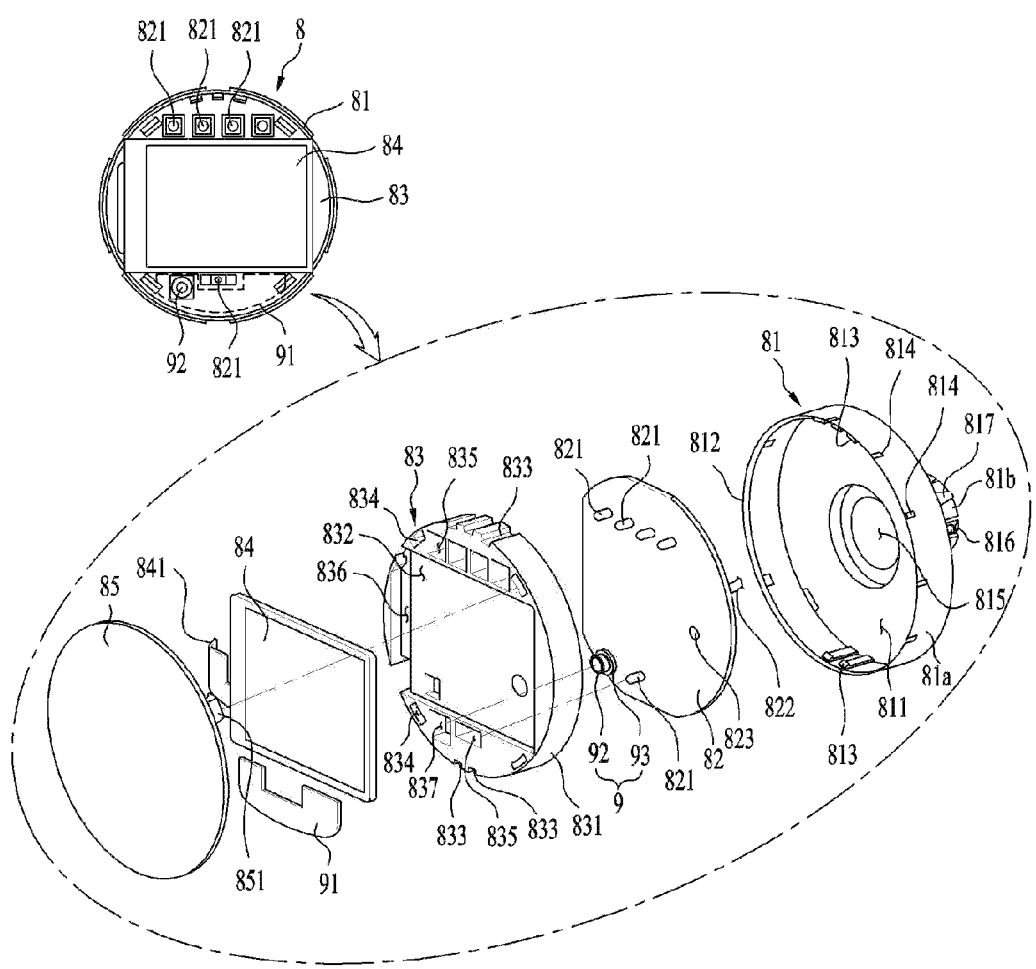
FIGS. 19 and 20 show a structure of the display part.

FIG. 19 shows an example of the display part 8. The display part 8 may include a housing 81 fixed to the fixed body 512 of the encoder and positioned inside the accommodation space 731 of the actuator, a display 84 fixed to the housing and configured to display information (information related to the control, operation or the like of the laundry treatment apparatus), and a circuit board (second circuit board or display circuit board) 82 arranged in the housing and provided with a circuit to control the display 84.

The housing 81 may include a fastening body 81b inserted into the body through-hole 514 through the shaft through-hole 711 and fixed to the fixed body 512, and an accommodation body 81a fixed to the fastening body 81b and positioned in the accommodation space 731.

The accommodation body 81a may be formed in any shape as long as it can be inserted into the accommodation space 731. FIG. 11 shows an example of the accommodation body 81a having a cylindrical shape.

A mounting space 811 is formed in the accommodation body 81a. The mounting space 811 communicates with the accommodation space 731 provided in the handle through an accommodation body through-hole 812 (wherein the accommodation body through-hole communicates with the handle through-hole). That is, the accommodation body through-hole 812 is provided on a side facing the position of the handle through-hole 732 in the space provided by the accommodation body 81a.

Figure 20:
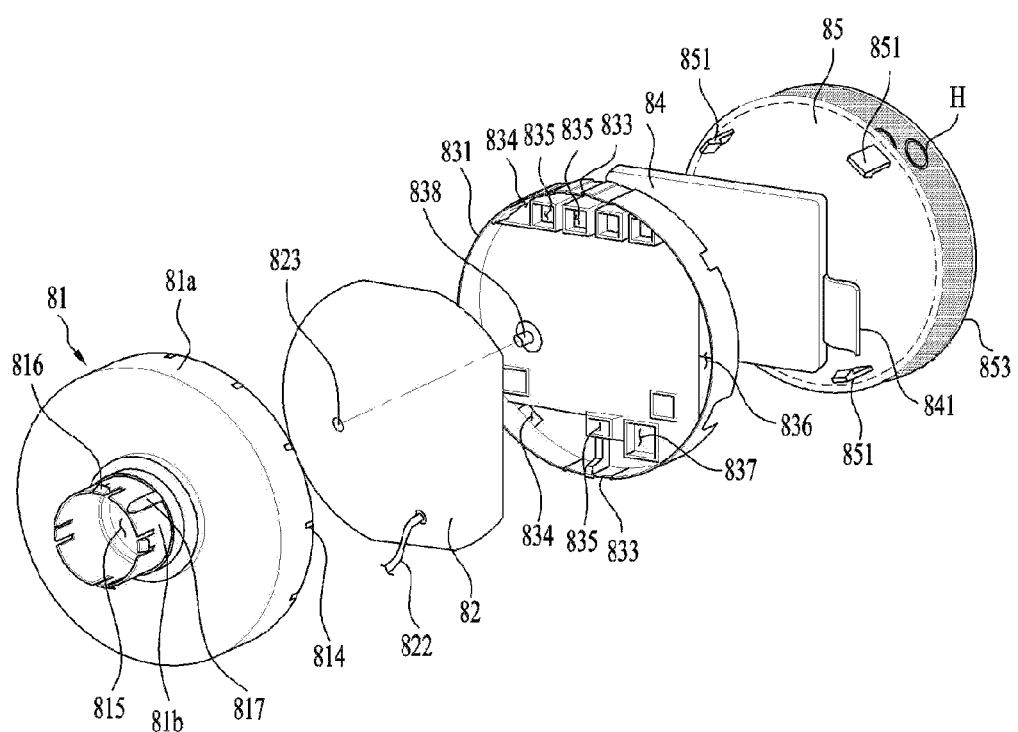

The fastening body 81b may be formed in any shape as long as it can be inserted into the shaft through-hole 711 and the encoder body through-hole 514. FIG. 20 shows an example of the fastening body 81b having a cylindrical shape. The fastening body 81b is provided with a fastening body through-hole 815 connected to the mounting space 811.

The circumferential surface of the fastening body 81b may be provided with a fixed body fastening portion 816. The fixed body fastening portion 816 serves to fix the housing 81 to the fastening body fixing portion provided in the encoder.

Further, the circumferential surface of the fastening body 81b may be further provided with multiple positioning protrusions 817.

The positioning protrusions 817 may have a shape insertable into the positioning grooves 532 provided in the encoder, and the positioning protrusions 817 are arranged at positions corresponding to the positions of the positioning grooves 532. The positioning protrusions 817 and the positioning grooves 532 serve to minimize the risk that the fastening body 81b fails to be coupled to the fastening body fixing portion 531 when the fastening body 81b is inserted into the body through-hole 514 (to ensure coupling of the fixed body fastening portion with the fastening body fixing portion).

As shown in FIG. 19, the second circuit board 82 is inserted into the mounting space 811, and a wire 822 connected to the second circuit board 82 is withdrawable out of the housing 81 through the fastening body through-hole 815. The second circuit board 82 may be provided with multiple lamps 821.

The second circuit board 82 may control the display 84 to display preset information according to electrical signals generated by the signal generator 54 when the handle 73 is rotated.

To maintain the spacing between the second circuit board 82 and the display 84 and to prevent damage to the lamps 821, a mounting part 83 positioned between the display 84 and the second circuit board 82 may be provided in the mounting space 811.

The mounting part 83 may include a mounting body 831 fixed to the accommodation body 81a and positioned inside the mounting space 811. The mounting body 831 may be formed in any shape as long as it can be inserted into the mounting space 811. FIG. 19 shows an example of the mounting body 831 formed in a roughly cylindrical shape.

One surface of the mounting body 831 is provided with a seating groove 832 to which the display 84 is fixed. The seating groove 832 may be provided with a connector through-hole 836. A connector (a flexible PCB or the like) 841 provided on the display 84 may be inserted into the connector through-hole 836 and connected to the second circuit board 82.

The mounting body 831 may be provided with lamp through-holes 835 into which the lamps 821 are inserted. The number of the lamp through-holes 835 provided may be the same as the number of the lamps 821, and the positions of the lamp through-holes 835 should be set in a space of the mounting body positioned above the seating groove 832, or a space of the mounting body positioned below the seating groove 832. This is intended to ensure that light emitted from the lamps 821 is transmitted to the outside of the housing 81 through the lamp through-holes 835.

The mounting part 83 is fixed to the housing 81 by a mounting body fastening portion 813 provided on the accommodation body 81a and an accommodation body fastening portion 833 provided on the mounting body 831. The mounting body fastening portion 813 may include multiple protrusions disposed inside the mounting space 811, and the accommodation body fastening portion 833 may include a groove provided on the circumferential surface of the mounting body 831 (one surface of the mounting body that contacts the accommodation body) such that the mounting body fastening portion 813 is fixed thereto.

The number of the mounting body fastening portions 813 may be the same as the number of the accommodation body fastening portions 833, and the positions of the mounting body fastening portions 813 and the accommodation body fastening portions 833 may correspond to each other.

In order to enhance the fastening of the mounting body 831, the accommodation body fastening portion 833 may be provided with an upper fastening portion arranged at a higher position than the seating groove 832 and a lower fastening portion arranged at a lower position than the seating groove 832. Unlike the example shown in the figure, the accommodation body fastening portion 833 may be provided on the left and right sides of the accommodation groove.

To prevent water and foreign substances from being introduced into the display 84 and the second circuit board 82, the accommodation body 81a may be further provided with a cover 85.

The cover 85 may be fixed to at least one of the accommodation body 81a and the mounting body 831, and be arranged to close the accommodation body through-hole 812. The cover 85 may include a material having transparency that allows the information displayed on the display 84 and the light emitted by the lamps 821 to be visible from the outside.

When the cover 85 is configured to be fixed to the mounting body 831, the cover 85 may include cover fixing protrusions 851 that protrude toward the mounting body 831, and the mounting body 831 may include fixing protrusion fastening portions 834 to which the cover fixing protrusions 851 are fastened.

As shown in FIG. 20, the second circuit board 82 may also be fixed to the mounting body 831. That is, the mounting part 83 may be provided with a protrusion 838 protruding from the mounting body 831 toward the second circuit board 82, and the second circuit board 82 may be provided with a protrusion through-hole 823 into which the protrusion 838 is inserted.

The cover 85 may further include a coversheet 853 that reduces the transparency of the cover. The transparency of the coversheet may be set to make it difficult to see the interior of the mounting space 811 from the outside (the transparency of the coversheet may be set lower than the transparency of the cover). The coversheet 853 may be fixed to the surface of the cover 85, and a letter or symbol H may be provided in the area of the coversheet through which the lamp through-holes 835 are projected.

As shown in FIG. 19, the interface P may further include a selector 9 configured to receive a control instruction input to select a control instruction displayed on the display 84.

The selector 9 may be configured to sense whether the user's body is in contact with the cover 85 to determine whether the control instruction displayed on the display 84 is selected by.

That is, the selector 9 may include a sensor 93 provided on the second circuit board 82 to sense static electricity on the user's body, and conductors 91 and 92 connecting the sensor 93 to the cover 85. The conductors 91 and 92 may include a first conductor 91 fixed to the cover 85, and a second conductor 92 connected at one end to the first conductor 91 and at the opposite end to the sensor 93. In this case, the mounting body 831 may be provided with a conductor through-hole 837 into which the second conductor 92 is inserted.

The first conductor 91 is a means to expand the area available for user contact facilitate the input of control instructions. In the interface P with the above-described structure, a display region R1 is formed in the upper space of the cover 85 and an input region R2 is formed in the lower space of the cover 85, as shown in FIG. 1. Thus, by setting the area of the first conductor 91 to be wide, the area of the input region R2 may expanded, and accordingly the user may be allowed more easily input control instructions. The area of the first conductor 91 may be set to ¼ to ½ of the area of the cover 85.

The interface P with the above-described structure may enable display of control instructions, search of displayed control instructions, and selection of a displayed control instruction, and minimize the space required for installation. However, the interface P with the above-described structure requires a means to prevent water or foreign substances from being introduced into the display part 8 and the actuator 7, or to discharge the water or foreign substances to the outside.

Figure 21:
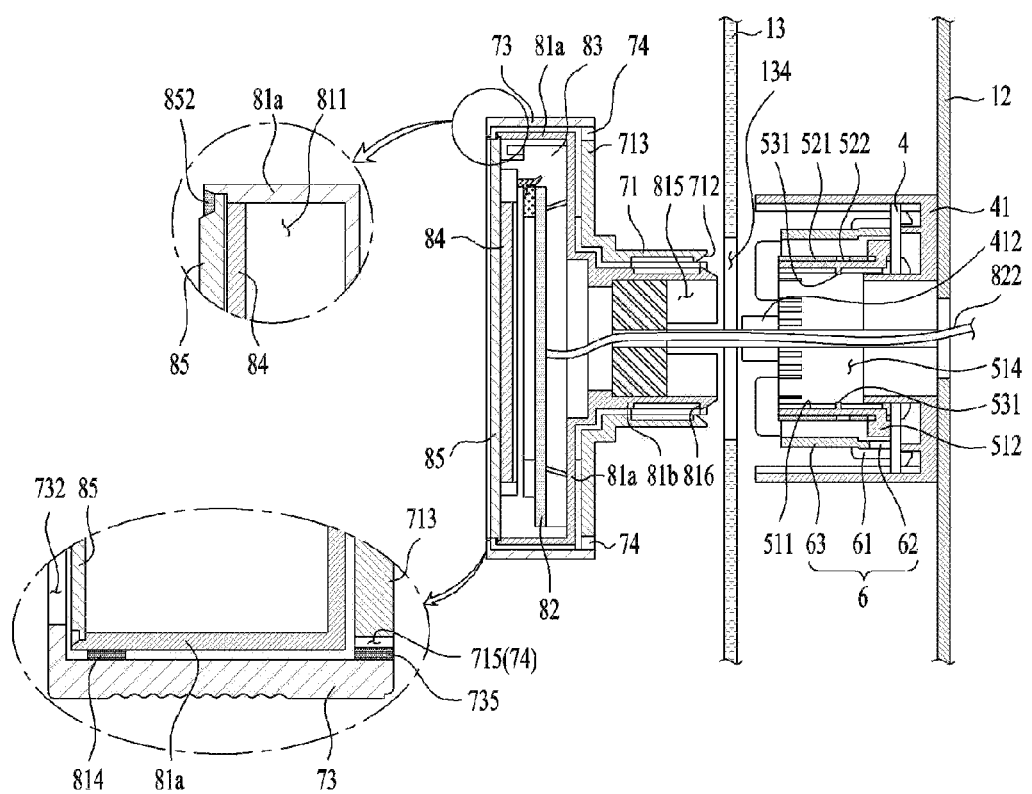
FIG. 21 shows an example of an assembly structure of the interface.

As shown in FIG. 21, the actuator 7 include a means to discharge water or foreign substances introduced into the handle through-hole 732 to the outside of the accommodation space 731, and the display part 8 may include a means to block water or foreign substances from being introduced into the housing 81.

As previously described, the actuator 7 is capable of discharging water or foreign substances introduced into the accommodation space 731 to the outside of the accommodation space through the handle outlet 74 provided in the handle.

The display part 8 may include a sealing portion (or fastening body sealing portion) 75, which prevents foreign substances from being introduced into the fastening body through-hole 815, and a cover sealing portion 852, which seals the space between the cover 85 and the accommodation body through-hole 812.

The cover sealing portion 852 may include an adhesive material that is sprayed onto the accommodation body 81a along the edge of the cover 85 to fill the space between the cover 85 and the accommodation body 81a and fix the cover 85 to the accommodation body 81a.

The sealing portion 75 may be inserted into the fastening body through-hole 815 to fix the position of the wire 822 and to block foreign substances such as water from being introduced into the fastening body through-hole 815.

Figure 22:
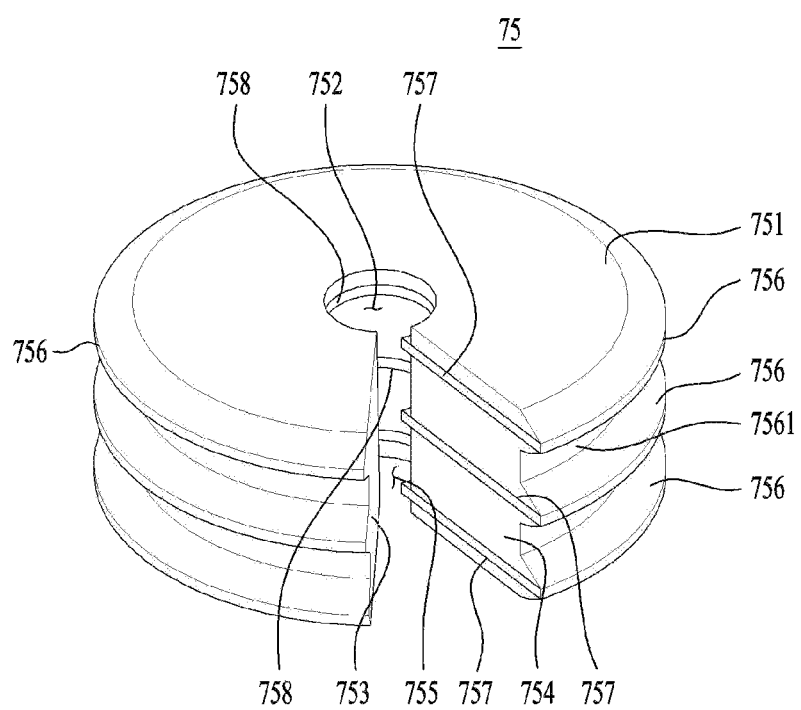
FIG. 22 shows an example of a sealing portion provided to the actuator.

FIG. 22 shows an example of the sealing portion 75. The sealing portion 75 of FIG. 22 includes a sealing body 751 inserted into the fastening body through-hole 815, a sealing body through-hole 752 formed through the sealing body 751 to allow the wire 822 to be inserted thereinto, and cut-open portion 753, 754, and 755 formed by cutting away a circumferential surface of the sealing body 751 to connect the circumferential surface of the sealing body 751 to the sealing body through-hole 752.

The sealing body 751 may be formed in any shape as long as it can be inserted into the fastening body through-hole 815. FIG. 22 shows an example of the sealing body 751 formed in a cylindrical shape.

The diameter of the sealing body 751 may be set to be greater than the diameter of the fastening body through-hole 815. In this case, the material of the sealing body 751 may be rubber, silicone or the like having a relatively large resilience such that the fastening body through-hole 815 may be closed through press-fitting.

The cut-open portion may include a first cut-open surface 753 extending from a circumferential surface of the sealing body 751 toward the center of the sealing body through-hole 752, a second cut-open surface 754 extending from the circumferential surface of the sealing body 751 toward the center of the sealing body through-hole 752 and spaced apart from the first cut-open surface 753, and an cut-open groove 755 formed between the first cut-open surface 753 and the second cut-open surface 754. The wire 822 may be inserted into or withdrawn from the sealing body through-hole 752 via the an cut-open groove 755.

The spacing between the first and second cut-open surfaces 753 and 754 may be sett to a length allowing the two cut-open surfaces 753 and 754 to contact each other to close the cut-open groove 755 when the sealing body 751 is inserted into the fastening body through-hole 815.

In order to more reliably prevent foreign substances from being introduced into the space formed between the circumferential surface of the sealing body 751 and the fastening body through-hole 815, the circumferential surface of the sealing body 751 may be further provided with a first contact protrusion 756.

The first contact protrusion 756 may include a band-shaped protrusion extending from the first cut-open surface 753 to the second cut-open surface 754 along the circumferential surface of the sealing body 751. The first contact protrusion 756 may include multiple band-shaped protrusions arranged spaced apart from each other along the height direction of the sealing body 751.

The sealing body 751 may be further provided with a second contact protrusion 757 to prevent foreign substances from being introduced into the cut-open groove 755. The second contact protrusion 757 may protrude from at least one of the first cut-open surface 753 and the second cut-open surface 754 toward the other one.

Further, the second contact protrusion 757 may connect the first contact protrusion 756 to the sealing body through-hole 752, or connect the sealing body through-hole 752 to a point 7561 positioned between two first contact protrusions 756.

To prevent foreign substances from being introduced into the space between the wire 822 and the sealing body through-hole 752, the sealing body through-hole 752 may be provided with a third contact protrusion 758. This is because even when the diameter of the sealing body through-hole 752 (the diameter formed when the sealing body is inserted into the fastening body through-hole) is set smaller than the diameter of the wire 822, the possibility of foreign substances entering through the sealing body through-hole 752 cannot be excluded.

The third contact protrusion 758 may include a band-shaped protrusion that protrudes from a side of the sealing body 751 defining the sealing body through-hole 752 toward the center of the sealing body through-hole 7552. The third contact protrusion 758 may extend from the first cut-open surface 753 to the second cut-open surface 754 and be connected to the second contact protrusion 757.

Hereinafter, the assembly process for the interface P described above will be described with reference to FIG. 21.

The first circuit board 4 is fixed to the case 41 with the encoder 5 and the encoder cover 6 coupled thereto. The surface of the first circuit board 4 fixed to the case 41 has an insulating material applied thereto.

The case 41 may be fixed to the cabinet 1 through the mounting panel 13, or may be fixed to the cabinet 1 through the panel support 12. When the case 41 is fixed to the mounting panel 13, the case 41 may be fixed to the mounting panel 13 by a bolt that is fixed to the second boss 412 through the mounting panel 13, and the mounting panel 13 may be fixed to the panel support 12 by a bolt or the like.

When the shaft 71 of the actuator 7 is inserted into the panel through-hole 134 provided in the mounting panel after the mounting panel 13 is fixed to the panel support 12, the shaft 71 may be fixed to the rotational body 521 of the encoder, and the fastening body 81b of the display part may be fixed to the support body 511 of the encoder.

That is, when the shaft 71 is inserted into the panel through-hole 134, the rotational body fastening portion 712 provided on the shaft is fixed to the shaft fastening portion 522 provided on the rotational body, and the fixed body fastening portion 816 provided on the fastening body 81b is fixed to the fastening body fixing portion 531 provided in the body through-hole 514. Accordingly, the actuator 7 is rotatably fixed to the first circuit board 4 by the rotational body 521, and the display part 8 is fixed to the first circuit board 4 by the support body 511.

In this case, the wire 822 withdrawn to the outside through the fastening body through-hole 815 may be inserted into the cabinet 1 through the body through-hole 514 provided in the encoder, the first boss through-hole 413 provided in the case, and the wire passing hole 123 provided in the panel support.

The interface P with the structure described above will display preset control instructions (search and change control instructions) on the display 84 whenever the user turns the handle 73 (whenever the encoder generates an electrical signal).

When a desired control instruction is displayed on the display 84, the user may select the displayed control instruction using the selector 9, and the control instruction selected using the selector 9 may be initiated when the user inputs an execution instruction through the second input unit 47.

Since the handle 73 is rotatably coupled to the first circuit board 4, while the housing 81 of the display part is fixed to the first circuit board 4, it is necessary to keep the distance between the handle 73 and the housing 81 constant. This is because if the distance between the handle 73 and the housing 81 is not kept constant, the rotation of the handle 73 may be constrained.

In order to keep the distance between the handle 73 and the housing 81 constant, at least one of the circumferential surface of the accommodation body 81a or the accommodation space 731 provided in the handle may be further provided with a spacer.

FIG. 19 shows one example of the spacer. The spacer 814 in FIG. 19 is a protrusion protruding from the circumferential surface of the accommodation body 81a toward the circumferential surface of the handle 73. The spacer 814 may include multiple protrusions equally spaced apart from each other along the circumferential surface of the accommodation body 81a. As shown in the figure, the spacer may include a protrusion protruding from the circumferential face of the handle 73 toward the circumferential surface of the accommodation body 81a.

The above-described structure, control method, and assembly method of the interface and laundry treatment apparatus are merely intended to illustrate an example of the interface and laundry treatment apparatus, and the scope of the present disclosure is not limited to the above-described embodiments.

The invention claimed is:

1. A laundry treatment apparatus comprising:
a cabinet comprising:
   a cabinet body having an open surface,
   a panel support coupled to the cabinet body, and
   a mounting panel that is coupled to the panel support and covers the open surface of the cabinet body, the mounting panel defining a panel inlet that passes therethrough;
a drum rotatably disposed inside the cabinet and configured to receive laundry, the drum defining a drum inlet that faces the panel inlet; and
a shielding part comprising:
   a shielding body that covers a space between the mounting panel and the panel support,
   a panel fastening portion that couples the shielding body to the mounting panel, and
   an extension fastening portion that couples the shielding body to the panel support.

2. The laundry treatment apparatus of claim 1, wherein the extension fastening portion is disposed between the mounting panel and the panel support and connects the mounting panel to the panel support.

3. The laundry treatment apparatus of claim 2, wherein the mounting panel comprises a panel rib that faces the extension fastening portion and is coupled to the extension fastening portion.

4. The laundry treatment apparatus of claim 3, wherein the panel support comprises a support coupling portion that faces the extension fastening portion and is coupled to the extension fastening portion.

5. The laundry treatment apparatus of claim 4, wherein the panel rib defines a panel coupling hole that passes therethrough,
   wherein the shielding part defines a shielding part coupling hole that passes through the extension fastening portion and faces the panel coupling hole, and
   wherein the panel support defines a support coupling hole that passes through the support coupling portion and faces the shielding part coupling hole.

6. The laundry treatment apparatus of claim 5, further comprising:
   a coupling member that extends through the panel coupling hole, the shielding part coupling hole, and the support coupling hole.

7. The laundry treatment apparatus of claim 4, wherein the extension fastening portion is disposed between the panel rib and the support coupling portion and coupled to the panel rib and the support coupling portion.

8. The laundry treatment apparatus of claim 4, wherein the panel support comprises a support coupling protrusion that extends from the support coupling portion in a direction away from the extension fastening portion and is coupled to the cabinet body, and
   wherein the cabinet body defines a support coupling hole that receives the support coupling protrusion.

9. The laundry treatment apparatus of claim 1, wherein the shielding part further comprises a reinforcing rib that protrudes from the shielding body toward the mounting panel and provides a rigidity of the shielding body.

10. The laundry treatment apparatus of claim 9, wherein the reinforcing rib extends from the extension fastening portion in a direction away from the panel support.

11. The laundry treatment apparatus of claim 1, wherein the cabinet body further comprises a cover panel defining a top surface of the cabinet body, and
   wherein the shielding part is coupled to a top surface of the mounting panel.

12. The laundry treatment apparatus of claim 11, wherein the shielding body covers a space between the panel support and the cover panel.

13. The laundry treatment apparatus of claim 12, wherein the shielding body has:
   a first side that contacts the mounting panel; and
   a second side that is opposite to the first side and contacts the cover panel.

14. The laundry treatment apparatus of claim 1, wherein the shielding body comprises:
   a shielding surface disposed above the mounting panel; and
   a connection surface that connects the shielding surface to the mounting panel.

15. The laundry treatment apparatus of claim 14, wherein the connection surface comprises (i) an inclined surface extending from the mounting panel toward the shielding surface or (ii) a curved surface having a preset curvature.

16. The laundry treatment apparatus of claim 15, wherein the mounting panel comprises:
   a top surface that faces the shielding surface;
   a front surface that defines the panel inlet; and
   a corner that connects the top surface of the mounting panel to the front surface of the mounting panel, and
   wherein the connection surface connects the shielding surface to the corner of the mounting panel.

17. The laundry treatment apparatus of claim 1, wherein the cabinet defines a panel through-hole that passes through the mounting panel, and
   wherein the laundry treatment apparatus further comprises:
      a first circuit board disposed inside the cabinet; and
      an encoder comprising (i) a fixed part fixed to the first circuit board, (ii) a rotary part rotatably coupled to the fixed part, and (iii) a signal generator configured to generate an electrical signal based on rotation of the rotary part.

18. The laundry treatment apparatus of claim 17, further comprising an actuator, the actuator comprising:
   a shaft inserted into the panel through-hole and coupled to the rotary part, the shaft defining a shaft through-hole that passes through the shaft and receives the rotary part inserted thereinto; and
   a handle fixed to the shaft and positioned outside of the cabinet, the shaft being configured to receive force for rotating the shaft,
   wherein the handle has:
      an accommodation space that is defined inside the handle and in fluid communication with the shaft through-hole, and
      a handle through-hole that passes through a surface of the handle and fluidly connects the accommodation space with an outside of the handle.

19. The laundry treatment apparatus of claim 18, further comprising a display part, the display part comprising:
   a fastening body inserted into the shaft through-hole and fixed to the fixed part;
   an accommodation body fixed to the fastening body and disposed inside the accommodation space; and
   a display that is fixed to the accommodation body and faces the handle through-hole, the display being configured to display information.

20. The laundry treatment apparatus of claim 19, wherein the display is configured to display preset information based on the electrical signal generated by the signal generator.

* * * * *